(12) United States Patent
Ogawa et al.

(10) Patent No.: US 6,391,974 B1
(45) Date of Patent: May 21, 2002

(54) PRESSURE SENSITIVE ADHESIVE

(75) Inventors: Atsuko Ogawa, Yokohama; Tatsuo Sassa, Ichihara; Hirofumi Jyouhouji, Ichihara; Hidetake Hozumi, Ichihara, all of (JP)

(73) Assignee: Sumitomo Chemical Co., Ltd., Osaka (JP)

( * ) Notice: Subject to any disclaimer, the term of this patent is extended or adjusted under 35 U.S.C. 154(b) by 0 days.

(21) Appl. No.: 09/658,863

(22) Filed: Sep. 8, 2000

(30) Foreign Application Priority Data

Sep. 10, 1999 (JP) .......................... 11-257718
Feb. 4, 2000 (JP) ....................... 2000-028133

(51) Int. Cl.$^7$ .................. C08L 23/00; C08L 9/00; C08L 23/10
(52) U.S. Cl. ................. 525/191; 525/232; 525/240
(58) Field of Search ................. 525/191, 232, 525/240

(56) References Cited

U.S. PATENT DOCUMENTS 6,087,447 A * 7/2000 Stevens et al. ............. 525/211
6,100,334 A * 8/2000 Abdou-Sabet ............. 525/191
6,254,956 B1 * 7/2001 Kjellqvist et al. ............ 428/44

FOREIGN PATENT DOCUMENTS

| JP | 4-55488 A | 2/1992 |
| JP | 5-37171 B | 6/1993 |
| JP | 8-157791 A | 6/1996 |

* cited by examiner

*Primary Examiner*—Nathan M. Nutter
(74) *Attorney, Agent, or Firm*—Fitch, Even, Tabin & Flannery

(57) ABSTRACT

A pressure-sensitive adhesive comprising an olefin-based copolymer wherein (1) the olefin-based copolymer has a tensile strength at break measured according to JIS K 6251 of 2.0 MPa or less, and (2) the elongation at break EB(%) of a resin composition obtained in blending the olefin-based copolymer with a polypropylene-based resin having a 20° C. xylene-soluble component content of 20 wt % or less satisfies the following formula 1: $S[2/6] \geq -800$, wherein $S[2/6]$ represents the gradient of a primary straight line, and Pa represents the weight content proportion of the olefin-based copolymer contained in the resin composition.

7 Claims, No Drawings

PRESSURE SENSITIVE ADHESIVE

FIELD OF THE INVENTION

The present invention relates to pressure-sensitive adhesives, pressure-sensitive adhesive sheets or films, and hot-melt adhesives. Specifically, the present invention relates to pressure-sensitive adhesives which are useful such as for pressure-sensitive adhesive films which pressure-sensitively adhere to the surfaces of a synthetic resin plate, decorative plywood, metal plate, coated steel plate and the like to protect the surfaces from dust adhesion and scratching. The present invention also relates to pressure-sensitive adhesive sheets and films which are useful such as for masking tapes used for baking coatings on automobiles and the like, and as masking tapes used for solder immersion of printed wiring boards and the like, as well as other uses. The present invention further relates to hot-melt adhesives useful for adhesion of a polyolefin resin, mutual adhesion of rubber, adhesion between different materials such as rubber and metal, and the like.

BACKGROUND OF THE INVENTION

Conventionally, pressure-sensitive adhesive sheets or films have been used to protect the surface of a coated body, such as a coated body used for working, storage and transportation of building materials, electric insulation, electronic products, and automobiles and the like. Such pressure-sensitive adhesive sheets or films should have excellent pressure-sensitive adhesion and, simultaneously, they should be able to be peeled off easily after use thereof without contaminating the surface of the coated body with the pressure-sensitive adhesive. Recently, pressure-sensitive adhesive sheets or films comprising a substrate made of a polyolefin-based resin are increasingly being used instead of pressure-sensitive adhesive sheets or films comprising a substrate made of a plastic vinyl chloride resin. The pressure-sensitive adhesive sheets or films comprising a substrate made of a polyolefin-based resin that mainly have been used in that manner are those integrally formed by co-extrusion of a pressure-sensitive adhesive layer made of a low crystalline or amorphous pressure-sensitive adhesive such as ethylene vinylacetate copolymer (EVA), low density polyethylene and the like, or a pressure-sensitive adhesive layer made of an elastomer such as styrene-isoprene-styrene block copolymer (SIS), hydrogenated styrene-butadiene-styrene block copolymer (SEBS) and the like, with a substrate. However, the above-mentioned pressure-sensitive adhesive sheets or films have problems in that when they are left under a high temperature environment, a change occurs with the lapse of time, causing an increase in pressure-sensitive adhesion force leading to difficulties when later peeling the adhesive sheet or film from the coated body, leaving behind pressure-sensitive adhesive material as a contaminant on the surface of the body, and the like. Japanese Patent Application Laid-Open (JP-A) No. 4-55488 discloses a pressure-sensitive adhesive sheet or film causing no change with the lapse of time even under high temperature environment, in which a pressure-sensitive adhesive film comprising a pressure-sensitive adhesive layer made of a polyethylene or ethylene/α-olefin copolymer having a density of 0.92 g/cm² or less and a melt index of 1 to 20 g/10 minutes is formed on one surface of a substrate layer made of a thermoplastic resin. Further, JP-A No. 8-157791 discloses a pressure-sensitive adhesive film composed of a pressure-sensitive adhesive layer made of an ethylene-α-olefin copolymer having a weight-average molecular weight Mw of $5\times10^4$ or more, Mw/Mn of 3 or less in which "Mw/Mn" is a ratio of the weight-average molecular weight (Mw) to the number-average molecular weight (Mn), a melting peak temperature in DSC analysis of 110° C. or more, and a heat of fusion of 100 J/g or less, and a substrate made of another polyolefin-based resin. However, these pressure-sensitive adhesive films have low pressure-sensitive adhesion, and in particular, extremely lowered pressure-sensitive adhesion at lower temperature.

On the other hand, hot-melt adhesives containing EVA and the like have been developed. However, they have disadvantageous properties such as insufficient flexibility, crystalline property, and the like. Therefore, the pressure-sensitive adhesion changes significantly, depending on the temperature of usage. In particular, sufficient pressure-sensitive adhesion is not obtained under a low temperature environment. Further, since an adhesion temperature is required that is not lower than the melting temperature, these hot-melt adhesives are not suitable for a material to be adhered which tends to show thermal deformation.

Further, rubber adhesion complexes, such as used in a tire, conveyer belt, hose, lining product and the like, are produced by laminating un-vulcanized rubber materials and then vulcanizing for adhesion. However, a problem arises in that a strongly adhered rubber adhered complex is not obtained, and this occurs because when the above-mentioned rubber materials are laminated, compatibility between un-vulcanized rubber materials maybe poor, and the vulcanization speeds may vary significantly, and the forms of cross-linking and the like may vary significantly as between the rubber materials, leading to an absence of co-vulcanizing property. Moreover, it is known to use a rubber sheet as a water-proof sheet in the water proofing of concrete buildings and the like. However, since the size of the rubber sheet obtained by molding, vulcanization and the like is limited as compared with a sheet otherwise used for such a purpose in the construction field, a considerable number of rubber sheets have to be added and assembled along the length and breadth directions at the construction site. Conventionally, therefore, many pieces of rubber sheets are spread out at the construction site, and edge portions thereof are overlapped and an adhesive is applied on the edge portions, to adhere the rubber sheets together. As the above-mentioned adhesive, a solvent type polychloroprene adhesive is primarily used. Since an organic solvent is used in the above-mentioned polychloroprene adhesive, the organic solvent is vaporized in execution, causing undesirable effects from the standpoints of safety and hygienics for humans, and environmental protection. On the other hand, an aqueous adhesive prepared by compounding tackifier resin into rubber latex is suggested as an adhesive using no organic solvent; however, this aqueous adhesive has problems in terms of adhesion force in that strong adhesion is not obtained easily and peeling tends to occur. Further, a method is known for mutual adhesion of rubbers in which a plastic material, such as a high-pressure polyethylene, polypropylene, polystyrene and the like, is provided so as to intervene between rubbers to be adhered; however, this method has a drawback in that the flexibility of a rubber-adhered complex is lowered due to hardening of the adhered portion.

SUMMARY OF THE INVENTION

Under these circumstances, the present inventors have found that the above-mentioned problems are solved by using a unique olefin-based copolymer having certain specific physical properties and a thermoplastic resin composition obtained by using this olefin-based copolymer.

The present invention relates to a unique pressure-sensitive adhesive comprising a specific polymer which can provide a thermoplastic resin composition having an excellent balance of flexibility, heat-resistance, cold-resistance and weather-resistance. The present invention also relates to an adhesive sheet or film composed of this pressure-sensitive adhesive. The present invention also relates to a unique hot-melt adhesive. More particularly, the present invention relates to a pressure-sensitive adhesive which pressure-sensitively adheres or adheres without using an organic solvent, and also maintains suitable pressure-sensitive adhesion without causing extreme change with the lapse of time, even under a low temperature environment or a high temperature environment and irrespective of the environmental temperature under which a connected article is placed.

Namely, the present invention relates to a pressure-sensitive adhesive comprising an olefin-based copolymer wherein (1) the olefin-based copolymer has a tensile strength at break measured according to JIS K 6251 of 2.0 MPa or less, and
(2) the elongation at break EB(%) of a resin composition obtained in blending the olefin-based copolymer with a polypropylene-based resin having a 20° C. xylene-soluble component content of 20 wt % or less satisfies the following formula 1:

$$S[2/6] \geq -800 \quad \text{(formula 1)}$$

wherein, S[2/6] represents the gradient of a primary straight line obtained by approximation according to the least square method of a multiple regression curve in Pa=0.20 to 0.60 region of a multiple regression formula derived by quintet multiple regression of a curve obtained by plotting the elongation at break EB(%) (according to JIS K 6251) of the resin composition on the ordinate and the weight content proportion Pa of the olefin-based copolymer contained in the resin composition on the abscissa wherein, Pa represents the weight content proportion of the olefin-based copolymer contained in the resin composition, and said multiple regression formula essentially includes data at least at seven points of Pa=0.00, 0.20, 0.30, 0.40, 0.50, 0.60 and 0.70, and when further number of points are included, all Pa values are essentially situated mutually at an interval of 0.10 or less.

The present invention also relates to a pressure-sensitive adhesive sheet or film comprising the above-mentioned pressure-sensitive adhesive, and another aspect of the present invention is a hot-melt adhesive comprising the above-mentioned pressure-sensitive adhesive.

DETAILED DESCRIPTION OF THE INVENTION

The olefin-based copolymer used in the present invention is an olefin-based copolymer having a tensile strength at break measured according to JIS K 6251 of 2.0 MPa or less, preferably 1.8 MPa or less, more preferably 1.6 MPa or less, further preferably 1.4 MPa or less, further more preferably 1.2 MPa or less, still further more preferably 1.0 MPa or less and particularly preferably 0.8 MPa or less. When the tensile strength at break is outside of this range, the resulting olefin-based copolymer and a thermoplastic resin composition containing this olefin-based copolymer are inferior in flexibility, leading to poor pressure-sensitive adhesion force of a pressure-sensitive adhesive comprising this composition, and in the case of use as a hot-melt adhesive, the flexibility of the connected portion becomes poor.

In formula 1, S[2/6] is preferably $$S[2/6] \geq -800,$$

more preferably, $$S[2/6] \geq -200,$$

further preferably, $$S[2/6] \geq -100,$$

particularly preferably, $$S[2/6] \geq -50.$$

When the olefin-based copolymer used in the present invention does not satisfy the relation of formula 1, the resulting olefin-based copolymer and a thermoplastic resin composition containing this olefin-based copolymer are inferior in balancing flexibility, heat-resistance, cold-resistance and weather-resistance; and therefore, the stable pressure-sensitive adhesion force becomes unstable and poor, depending on environmental temperature under which a connected body obtained by using a pressure-sensitive adhesive comprising the copolymer is placed, and in the case of use as a hot-melt adhesive, the flexibility of the connected portion becomes poor.

A multiple regression formula derived by quintet multiple regression of a curve obtained by plotting the elongation at break EB(%) according to JIS K 6251 of the resin composition on the ordinate, and the weight content proportion Pa of the olefin-based copolymer contained in the resin composition plotted on the abscissa is preferably calculated using data at blend composition points where the weight content proportion Pa of the olefin-based copolymer is 0.00, 0.20, 0.30, 0.40, 0.50, 0.60 and 0.70.

The elongation at break EB(%) of the resin composition can be measured according to JIS K 6251, for example, using a dumbbell form No. 3 test piece at a tension speed of 200 mm/min. The number of the test piece was 3, and an arithmetic mean value can be used as the measured result. Herein, for obtaining the measured result of higher accuracy, the number of the test piece is preferably 5 or more, more preferably 7 or more and further preferably 9 or more, and the resulted elongation at break can be arithmetically averaged to give a result to be used. For removing the result of irregular low elongation at break, it is preferable to delete results revealing tensile strength at break which is 80% or less of the median of the measured results or of the average of two values surrounding the median, and to arithmetically average the remaining measured results to give a result to be used.

For blending an olefin-based copolymer with a polypropylene-based resin having a 20° C. xylene-soluble component content of 20 wt % or less, the components may be advantageously kneaded using a usual kneading apparatus, for example, a rubber mill, Brabender mill, Banbury mixer, press kneader, ruder, twin-screw extruder and the like. The kneading temperature is a temperature at which all of mixed components are melted, and usually from 160 to 250° C., preferably from 180 to 240° C. The resulted resin composition is press-molded to the defined thickness by a method according to JIS K 6758, to give a sample of the tensile test.

The above-mentioned quintet multiple regression can be calculated, for example, by methods shown in "Kagakusha oyobi Kagaku Gijutsusha no tameno Toukeiteki Houhou (Statistical method for chemist and chemical engineer)" (sec. Ed.) (pub. Tokyo Kagaku Dojin K.K.) chapters 6.3 and 6.4. The multiple correlation coefficient R and the gradient S obtained by straight line regression using the least square method can be calculated, for example, by methods shown in "Kagakusha oyobi Kagaku Gijutsusha no tameno Toukeiteki Houhou (Statistical method for chemist and chemical engineer)" (sec. Ed.) (pub. Tokyo Kagaku Dojin K.K.) chapters 6.3 and 6.4.

In the olefin-based copolymer used in the present invention, it is further preferable that the relation of the following formula 2 is satisfied in addition to the above-mentioned relation, from the standpoint of stability of surface nature and condition of a resin composition, $$R[3/5]-R[2/6] \geq 0.15 \qquad \text{formula 2}$$

wherein, $R[3/5]$ and $R[2/6]$ represent the multiple correlation coefficients of primary straight lines obtained by approximation according to the least square method of multiple regression curves in Pa=0.30 to 0.50 and Pa=0.20 to 0.60 regions of a multiple regression formula derived by quintet multiple regression of a curve obtained by plotting the elongation at break EB(%) according to JIS K 6251 of the resin composition on the ordinate and the weight content proportion Pa of the olefin-based copolymer contained in the resin composition on the abscissa wherein, Pa represents the weight content proportion of the olefin-based copolymer contained in the resin composition. Herein, said multiple regression formula essentially includes data at least at seven points of Pa=0.00, 0.20, 0.30, 0.40, 0.50, 0.60 and 0.70, and when an additional number of points are included, all Pa values are essentially situated mutually at an interval of 0.10 or less.

In this relation, $R[3/5]$ and $R[2/6]$ are preferably $$R[3/5]-R[2/6] \geq 0.20,$$

more preferably, $$R[3/5]-R[2/6] \geq 0.25,$$

further preferably, $$R[3/5]-R[2/6] \geq 0.30,$$

particularly preferably, $$R[3/5]-R[2/6] \geq 0.35,$$

most preferably, $$R[3/5]-R[2/6] \geq 0.40.$$

When the olefin-based copolymer used in the present invention does not satisfy the relations of formula 1 and formula 2, the resulting thermoplastic resin composition may have inferior surface stability in terms of surface nature and condition, such as manifested as bleeding on the surface with the lapse of time, and the like. Therefore, stable pressure-sensitive adhesion force with the lapse of time may not be obtained, depending on the environmental temperature under which a connected body obtained by using a pressure-sensitive adhesive comprising the copolymer is placed. On the other hand, in the case of use for a pressure-sensitive adhesive sheet or film, there is a concern about the occurrence of problems such as a pressure-sensitive component remaining as a contaminant on the surface after its release from a body, and the like.

In the olefin-based copolymer used in the present invention, it is further preferable that the relation of the following formula 3 is satisfied in addition to the above-mentioned relation from the standpoint of stability of the surface nature and condition of the resin composition, $$S[3/5]-S[2/6] \leq -50 \qquad \text{formula 3}$$

wherein, $S[3/5]$ and $S[2/6]$ represent the gradients of primary straight lines obtained by approximation according to the least square method of multiple regression curves in Pa=0.30 to 0.50 and Pa=0.20 to 0.60 regions of a multiple regression formula derived by quintet multiple regression of a curve obtained by plotting the elongation at break EB(%) according to JIS K 6251 of the resin composition on the ordinate and the weight content proportion Pa of the olefin-based copolymer contained in the resin composition on the abscissa wherein, Pa represents the weight content proportion of the olefin-based copolymer contained in the resin composition.

In this relation, $S[3/5]$ and $S[2/6]$ are preferably $$S[3/5]-S[2/6] \leq -70,$$

more preferably, $$S[3/5]-S[2/6] \leq -90,$$

particularly preferably, $$S[3/5]-S[2/6] \leq -110,$$

most preferably, $$S[3/5]-S[2/6] \leq -120.$$

When the olefin-based copolymer used in the present invention does not satisfy the relations of formula 2 and formula 3, the resulting olefin-based copolymer and a thermoplastic resin composition containing this olefin-based copolymer may have a poor balance of flexibility, heat-resistance, cold-resistance and weather-resistance, and a poor surface stability in terms of surface nature and condition. Therefore, stable pressure-sensitive adhesion force may not be obtained, depending on environmental temperature under which a connected body obtained by using a pressure-sensitive adhesive comprising the copolymer is placed.

The polypropylene-based resin having a 20° C. xylene-soluble component content of 20 wt % or less described in (2) in the present invention is a polypropylene-based resin (X) which is selected from polypropylene-based resins described in (i-4) below and satisfies the following requirements described later. The 20° C. xylene-soluble component content of the polypropylene-based resin means a numerical value obtained according to the following methods and conditions. Namely, about 200 mg of a polypropylene-based resin is weighed and mixed with 100 ml of xylene, and the resin is dissolved for 50 minutes while boiling xylene. After given time, the solution was left to cool for 20 minutes at room temperature, then, the polypropylene-based resin was crystallized with 0° C. ice water. Then, the mixture was kept for 1 hour in a constant temperature water bath at 20° C. Then, the xylene-soluble component is separated through a filter from the xylene-insoluble component, the xylene-insoluble component is dried by a vacuum drier to constant weight, the dried xylene-insoluble component is weighed, and the weight of the xylene-soluble component is calculated based the weight difference from the original sample. The xylene-soluble component content is represented in terms of percentage (wt %) of the weight of the xylene-soluble component based on the weight of the original sample.

In the polypropylene-based resin (X) having a 20° C. xylene-soluble component content of 20 wt % or less, it is preferable that the crystallization temperature Tc (° C.) and the crystallization heat ΔH (mj/mg) measured by using a differential scanning calorimeter (DSC) satisfy the following relation. Measurement of DSC is conducted, for example, using DSC 220C manufactured by Seiko Instruments Inc. at a speed of 10° C./min. of temperature raising and lowering processes, according to JIS K 7121 and JIS K 7122.

$$-10 \leq [\Delta H - (Tc \times 1.4) - 62] \leq 10$$

More preferably $$-8 \leq [\Delta H - (Tc \times 1.4) \times 62] \leq 8$$

Further preferably $$-6 \leq [\Delta H - (Tc \times 1.4) - 62] \leq 6$$

When the polypropylene-based resin (X) having a 20° C. xylene-soluble component content of 20 wt % or less does not satisfy the above-mentioned relation, it may be impossible to correctly determine a specific olefin-based copolymer which can provide a thermoplastic resin composition having excellent balance of flexibility, heat-resistance, cold-resistance, weather-resistance and stability of surface nature and condition.

The polypropylene-based resin (X) having a 20° C. xylene-soluble component content of 20 wt % or less is preferably crystalline polypropylene mainly having isotactic or syndiotactic sequence structure of homo type or of random type containing a comonomer, more preferably a polypropylene-based resin of random type containing a comonomer. This polypropylene-based resin can be obtained by adopting a gas phase polymerization method, bulk polymerization method or solvent polymerization method, and the number-average molecular weight of the polymer is not particularly restricted and preferably is controlled from 10,000 to 1,000,000.

For obtaining the polypropylene-based resin (X) having a 20° C. xylene-soluble component content of 20 wt % or less, there are generally listed methods in which a homopolymer of propylene is obtained or a copolymer is obtained by copolymerizing propylene with one or more olefins selected from olefins having 2 to 12 carbon atoms other than the propylene, by a slurry polymerization, gas phase polymerization or bulk polymerization method using what is called a Ziegler-Natta catalyst combining a titanium-containing solid transition metal component and an organometal component, or a metallocene catalyst comprising a compound of a transition metal of group IV to group VI of the periodic table having at least one cyclopentadienyl skeleton and a co-catalyst component. Further, commercially available products corresponding to the resins produced as described above can also be used.

When the above-mentioned parameters are not satisfied, the resulting olefin-based copolymer and a thermoplastic resin composition containing this olefin-based copolymer may be inferior in the balance of flexibility, heat-resistance, cold-resistance and weather-resistance; and, therefore, stable pressure-sensitive adhesion force may not be obtained, depending on environmental temperature under which a connected body obtained by using a pressure-sensitive adhesive comprising the copolymer is placed.

Further, from the standpoint of the flexibility of the olefin-based copolymer and thermoplastic resin composition containing this olefin-based copolymer used in the present invention, it is preferable that the following property is satisfied in addition to the above-mentioned property. Namely, in the olefin-based copolymer used in the present invention, it is preferable that the bending modulus (Ua (MPa)) of a thermoplastic resin composition obtained by blending with a homopolypropylene resin, measured according to JIS K 7203, satisfies the relation of the following formula.

$$Ua \leq 1.5 \times Sa \times (Ta/100)^{3.3}$$

More preferably $$Ua \leq 1.4 \times Sa \times (Ta/100)^{3.3}$$

Further preferably $$Ua \leq 1.3 \times Sa \times (Ta/100)^{3.3}$$

Particularly preferably $$Ua \leq 1.2 \times Sa \times (Ta/100)^{3.3}$$

When the bending modulus is outside the above-described range, the resulting olefin-based copolymer and a thermoplastic resin composition containing this olefin-based copolymer may be poor, consequently, the pressure-sensitive adhesion force of a pressure-sensitive adhesive comprising the copolymer may be poor. In the above-described formula, Ua represents the bending modulus (MPa) measured according to JIS K 7203 of the homopolypropylene resin used for blending, and Ta represents the weight (wt %) added of the homopolypropylene resin in the thermoplastic resin composition.

The olefin-based copolymer used in the present invention relates to a copolymer obtained by copolymerizing two or more monomer components selected from ethylene, α-olefin having 3 to 20 carbon atoms, polyene compound, cyclic olefin and vinyl aromatic compound, or a polymer obtained by homopolymerization using these monomers and the polymer has a structure corresponding to the copolymer. Specific examples of the monomers constituting this olefin-based copolymer include the following monomers (a) to (d).

(a) α-olefin

The α-olefin having 3 to 20 carbon atoms used in the present invention includes linear and branched α-olefins, and examples of the linear α-olefin include propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nanodecene, 1-eicosene and the like, and examples of the branched α-olefin include 3-methyl-1-butene, 3-methyl-1-pentene, 4-methyl-1-pentene, 2-ethyl-1-hexene, 2,2,4-trimethyl-1-pentene and the like, and linear propylene, 1-butene, 1-pentene, 1-hexene, 1-octene, 1-decene and the like are preferable.

(b) Polyene Compound

The polyene compound suitably used in the present invention include what is called a conjugated polyene compound having one single bond sandwiched between double bonds, and non-conjugated polyene compounds other than the aforesaid conjugated polyene compound. As the conjugated polyene compound, aliphatic conjugated polyene compounds, alicyclic conjugated polyene compounds, and the like are listed. The aliphatic conjugated polyene compound include linear aliphatic polyene compounds and branched aliphatic polyene compounds. Further, the aliphatic conjugated polyene compound and alicyclic conjugated polyene compound may contain an alkoxy group, aryl group, aryloxy group, aralkyl group, aralkyloxy group and the like. Examples of the aliphatic conjugated polyene compound include 1,3-butadiene, isoprene, 2-ethyl-1,3-butadiene, 2-propyl-1,3-butadiene, 2-isopropyl-1,3-butadiene, 2-hexyl-1,3-butadiene, 2,3-dimethyl-1,3-butadiene, 2,3-diethyl-1,3-butadiene, 2-methyl-1,3-pentadiene, 2-methyl-1,3-hexadiene, 2-methyl-1,3-octadiene, 2-methyl-1,3-decadiene, 2,3-dimethyl-1,3-pentadiene, 2,3-dimethyl-1,3-hexadiene, 2,3-dimethyl-1,3-octadiene, 2,3-dimethyl-1,3-decadiene and the like. Examples of the alicyclic polyene compounds include 2-methyl-1,3-cyclopentadiene, 2-methyl-1,3-cyclohexadiene, 2,3-dimethyl-1,3-cyclopentadiene, 2,3-dimethyl-1,3-cyclohexadiene, 2-chloro-1,3-butadiene, 2,3-dichloro-1,3-butadiene, 1-fluoro-1,3-butadiene, 2-chloro-1,3-pentadiene, 2-chloro-1,3-cyclopentadiene, 2-chloro-1,3-cyclohexadiene and the like.

As the non-conjugated polyene compound, aliphatic non-conjugated polyene compounds, alicyclic non-conjugated polyene compounds, aromatic non-conjugated polyene compounds and the like are listed. The aliphatic non-conjugated polyene compound include linear aliphatic non-conjugated polyene compounds and branched aliphatic non-conjugated polyene compounds. Further, the aliphatic non-conjugated polyene compound, alicyclic non-conjugated polyene compound and aromatic non-conjugated polyene compound may contain an alkoxy group, aryl group, aryloxy group, aralkyl group, aralkyloxy group and the like. Examples of the aliphatic non-conjugated polyene compound include 1,4-hexadiene, 1,5-hexadiene, 1,6-heptadiene, 1,6-octadiene, 1,7-octadiene, 1,8-nonadiene, 1,9-decadiene, 1,13-tetradecadiene, 1,5,9-decatriene, 3-methyl-1,4-hexadiene, 4-methyl-1,4-hexadiene, 5-methyl-1,4-hexadiene, 4-ethyl-1,4-hexadiene, 3-methyl-1,5-hexadiene, 3,3-dimethyl-1,4-hexadiene, 3,4-dimethyl-1,5-hexadiene, 5-methyl-1,4-heptadiene, 5-ethyl-1,4-heptadiene, 5-methyl-1,5-heptadiene, 6-methyl-1,5-heptadiene, 5-ethyl-1,5-heptadiene, 3-methyl-1,6-heptadiene, 4-methyl-1,6-heptadiene, 4,4-dimethyl-1,6-heptadiene, 4-ethyl-1,6-heptadiene, 4-methyl-1,4-octadiene, 5-methyl-1,4-octadiene, 4-ethyl-1,4-octadiene, 5-ethyl-1,4-octadiene, 5-methyl-1,5-octadiene, 6-methyl-1,5-octadiene, 5-ethyl-1,5-octadiene, 6-ethyl-1,5-octadiene, 6-methyl-1,6-octadiene, 7-methyl-1,6-octadiene, 6-ethyl-1,6-octadiene, 6-propyl-1,6-octadiene, 6-butyl-1,6-octadiene, 4-methyl-1,4-nonadiene, 5-methyl-1,4-nonadiene, 4-ethyl-1,4-nonadiene, 5-ethyl-1,4-nonadiene, 5-methyl-1,5-nonadiene, 6-methyl-1,5-nonadiene, 5-ethyl-1,5-nonadiene, 6-ethyl-1,5-nonadiene, 6-methyl-1,6-nonadiene, 7-methyl-1,6-nonadiene, 6-ethyl-1,6-nonadiene, 7-ethyl-1,6-nonadiene, 7-methyl-1,7-nonadiene, 8-methyl-1,7-nonadiene, 7-ethyl-1,7-nonadiene, 5-methyl-1,4-decadiene, 5-ethyl-1,4-dicadiene, 5-methyl-1,5-decadiene, 6-methyl-1,5-decadiene, 5-ethyl-1,5-decadiene, 6-ethyl-1,5-decadiene, 6-methyl-1,6-decadiene, 6-ethyl-1,6-decadiene, 7-methyl-1,6-decadiene, 7-ethyl-1,6-decadiene, 7-methyl-1,7-decadiene, 8-methyl-1,7-decadiene, 7-ethyl-1,7-decadiene, 8-ethyl-1,7-decadiene, 8-methyl-1,8-decadiene, 9-methyl-1,8-decadiene, 8-ethyl-1,8-decadiene, 6-methyl-1,6-undecadiene, 9-methyl-1,8-undecadiene, 6,10-dimethyl-1,5,9-undecatriene, 5,9-dimethyl-1,4,8-decatriene, 4-ethylidene-8-methyl-1,7-nonadiene, 13-ethyl-9-methyl-1,9,12-pentadecatriene, 5,9,13-trimethyl-1,4,8,12-tetradecatetraene, 8,14,16-trimethyl-1,7,14-hexadecatriene, 4-ethylidene-12-methyl-1,11-pentadecadiene and the like. Examples of the alicyclic non-conjugated polyene compound include vinylcyclohexene, 5-vinyl-2-norbornene, 5-ethylidene-2-norbornene, 5-methylene-2-norbornene, 5-isopropenyl-2-norbornene, cyclohexadiene, dicyclopentadiene, cyclooctadiene, 2,5-norbornadiene, 2-methyl-2,5-norbornadiene, 2-ethyl-2,5-norbornadiene, 2,3-diisopropylidene-5-norbornene, 2-ethylidene-3-isopropylidene-5-norbornene, 6-chloromethyl-5-isopropenyl-2-norbornene, 1,4-divinylcyclohexane, 1,3-divinylcyclohexane, 1,5-divinylcyclooctane, 1-allyl-4-vinylcyclohexane, 1,4-diallylcyclohexane, 1-allyl-5-vinylcyclooctane, 1,5-diallylcyclooctane, 1-allyl-4-isopropenylcyclohexane, 1-isopropenyl-4-vinylcyclohexane, 1-isopropenyl-3-vinylcyclopentane, methyltetrahydroindene and the like. Examples of the aromatic non-conjugated polyene compound include divinylbenzene, vinylisopropenylbenzene and the like.

(c) Cyclic Olefin Compound

Examples of the cyclic olefin constituting the olefin-based copolymer used in the present invention include norbornene, 5-methylnorbornene, 5-ethylnorbornene, 5-propylnorbornene, 5,6-dimethylnorbornene, 1-methylnorbornene, 7-methylnorbornene, 5,5,6-trimethylnorbornene, 5-phenylnorbornene, 5-benzylnorbornene, 5-ethylidenenorbornene, 5-vinylnorbornene, 1,4,5,8-dimethano-1,2,3,4,4a,5,8,8a-octahydronaphthalene, 2-methyl-1,4,5,8-dimethano-1,2,3,4,4a,5,8,8a-octahydronaphthalene, 2-ethyl-1,4,5,8-dimethano-1,2,3,4,4a,5,8,8a-octahydronaphthalene, 2,3-dimethyl-1,4,5,8-dimethano-1,2,3,4,4a,5,8,8a-octahydronaphthalene, 2-hexyl-1,4,5,8-dimethano-1,2,3,4,4a,5,8,8a-octahydronaphthalene, 2-ethylidene-1,4,5,8-dimethano-1,2,3,4,4a,5,8,8a-octahydronaphthalene, 2-fluoro-1,4,5,8-dimethano-1,2,3,4,4a,5,8,8a-octahydronaphthalene, 1,5-dimethyl-1,4,5,8-dimethano-1,2,3,4,4a,5,8,8a-octahydronaphthalene, 2-cyclohexyl-1,4,5,8-dimethano-1,2,3,4,4a,5,8,8a-octahydronaphthalene, 2,3-dichloro-1,4,5,8-dimethano-1,2,3,4,4a,5,8,8a-octahydronaphthalene, 2-isobutyl-1,4,5,8-dimethanol-1,2,3,4,4a,5,8,8a-octahydronaphthalene, 1,2-dihydrodicyclopentadiene, 5-chloronorbornene, 5,5-dichloronorbornene, 5-fluoronorbornene, 5,5,6-trifluoro-6-trifluoromethylnorbornene, 5-chloromethylnorbornene, 5-methoxynorbornene, 5,6-dicarboxynorborneneanhydride, 5-dimethylamino-norbornene, 5-cyclonorbornene, cyclopentene, 3-methylcyclo-pentene, 4-methylcyclopentene, 3,4-dimethylcyclopentene, 3,5-dimethylcyclopentene, 3-chlorocyclopentene, cyclohexene, 3-methylcyclohexene, 4-methylcyclohexene, 3,4-dimethylcyclohexene, 3-chlorocyclohexene, cycloheptene and the like.

(d) Vinyl Aromatic Compound

Examples of the vinyl aromatic compound which can be used in constituting the olefin-based copolymer used in the present invention include styrene, α-methylstyrene, p-methylstyrene, vinylxylene, monochlorostyrene, dichlorostyrene, monobromostyrene, dibromostyrene, fluorostyrene, p-tert-butylstyrene, ethylstyrene, vinylnaphthalene and the like.

Further, in the present invention, from the standpoint of stable pressure-sensitive adhesion force to an article to be adhered, which is one of objects of the present invention, it is preferable to use a polymer composed of a specific combination of monomers selected from the above-mentioned monomers, and preferable examples thereof include the following combinations ① to ⑲.

① Olefin-based copolymers obtained by copolymerizing ethylene and an α-olefin having 3 to 20 carbon atoms as essential components, and optionally, one or more monomer components selected from polyene compounds, cyclic olefins and vinyl aromatic compounds.

② Olefin-based copolymers obtained by copolymerizing ethylene and an α-olefin having 4 to 20 carbon atoms as essential components, and optionally, one or more monomer components selected from polyene compounds, cyclic olefins and vinyl aromatic compounds.

③ Olefin-based copolymers obtained by copolymerizing ethylene, propylene and an α-olefin having 4 to 20 carbon atoms as essential components, and optionally, one or more monomer components selected from polyene compounds, cyclic olefins and vinyl aromatic compounds.

④ Olefin-based copolymers obtained by copolymerizing propylene and an α-olefin having 4 to 20 carbon atoms as essential components, and optionally, one or more monomer components selected from polyene compounds, cyclic olefins and vinyl aromatic compounds.

⑤ Olefin-based copolymers composed of ethylene and an α-olefin having 4 to 20 carbon atoms.

⑥ Olefin-based copolymers composed of ethylene, an α-olefin having 4 to 20 carbon atoms and a polyene compound.

⑦ Olefin-based copolymers composed of ethylene, an α-olefin having 4 to 20 carbon atoms and acyclic olefin compound.

⑧ Olefin-based copolymers composed of ethylene, an α-olefin having 4 to 20 carbon atoms and a vinyl aromatic compound.

⑨ Olefin-based copolymers composed of ethylene, an α-olefin having 4 to 20 carbon atoms, a polyene compound and a vinyl aromatic compound.

⑩ Olefin-based copolymers composed of ethylene, propylene and an α-olefin having 4 to 20 carbon atoms.

⑪ Olefin-based copolymers composed of ethylene, propylene, an α-olefin having 4 to 20 carbon atoms and a polyene compound.

⑫ Olefin-based copolymers composed of ethylene, propylene, an α-olefin having 4 to 20 carbon atoms and a cyclic olefin compound.

⑬ Olefin-based copolymers composed of ethylene, propylene, an α-olefin having 4 to 20 carbon atoms and a vinyl aromatic compound.

⑭ Olefin-based copolymers composed of ethylene, propylene, an α-olefin having 4 to 20 carbon atoms, a polyene compound and a vinyl aromatic compound.

⑮ Olefin-based copolymers composed of propylene and an α-olefin having 4 to 20 carbon atoms.

⑯ Olefin-based copolymers composed of propylene, an α-olefin having 4 to 20 carbon atoms and a polyene compound.

⑰ Olefin-based copolymers composed of propylene, an α-olefin having 4 to 20 carbon atoms and acyclic olefin compound.

⑱ Olefin-based copolymers composed of propylene, an α-olefin having 4 to 20 carbon atoms and a vinyl aromatic compound.

⑲ Olefin-based copolymers composed of propylene, an α-olefin having 4 to 20 carbon atoms, a polyene compound and a vinyl aromatic compound.

Of the above-mentioned combinations, the following combinations are preferably used, from the standpoint that the pressure-sensitive adhesive of the present invention has stable pressure-sensitive adhesion force particularly under lower temperature environment.

② Olefin-based copolymers obtained by copolymerizing ethylene and an α-olefin having 4 to 20 carbon atoms as essential components, and optionally, one or more monomer components selected from polyene compounds, cyclic olefins and vinyl aromatic compounds.

③ Olefin-based copolymers obtained by copolymerizing ethylene, propylene and an α-olefin having 4 to 20 carbon atoms as essential components, and optionally, one or more monomer components selected from polyene compounds, cyclic olefins and vinyl aromatic compounds.

Of the above-mentioned combinations, the following combinations are preferably used, from the standpoint that the pressure-sensitive adhesive of the present invention has weather-resistance.

⑤ Olefin-based copolymers composed of ethylene, an α-olefin having 4 to 20 carbon atoms, a polyene compound and a vinyl aromatic compound.

⑩ Olefin-based copolymers composed of ethylene, propylene and an α-olefin having 4 to 20 carbon atoms.

Further, it is preferable that the olefin-based copolymer used in the present invention has neither a peak of 1 J/g or more based on melting of a crystal nor a peak of 1 J/g or more based on crystallization, when measured according to JIS K 7122 using a differential scanning calorimeter (DSC). Moreover, the olefin-based copolymer used in the present invention has a glass transition temperature (Tg) of preferably $-10°$ C. or less, more preferably $-20°$ C. or less, and particularly preferably $-25°$ C. or less. When this condition is not satisfied, an pressure-sensitive adhesive comprising the copolymer may be inferior in stable press-sensitive adhesion force under lower temperature environments, and in the case of use as a hot-melt adhesive, the flexibility of a connected portion may be poor.

As the differential scanning calorimeter, there is used, for example, a DSC 220C manufactured by Seiko Instruments Inc., and the measuring speed is $10°$ C./min. in temperature raising and lowering processes.

The olefin-based copolymer used in the present invention has a molecular weight distribution (Mw/Mn) measured by gel permeation chromatography (GPC) of preferably 5 or less, more preferably 4 or less and further preferably 3 or less. When the molecular weight distribution is too wide, bleed out of lower molecular weight components may increase, and a pressure-sensitive adhesive comprising the copolymer may not have sufficient stable pressure-sensitive adhesion force particularly under high temperature environments, and may tend to contaminate the surface of an article to be adhered after use.

Measurement of the molecular weight distribution is conducted by a gel permeation chromatography (GPC) method, for example, using 150C/GPC apparatus, manufactured by Waters Co. The elution temperature is $140°$ C., and for example, a Shodex Packed Column A-80M manufactured by Showa Denko K.K. is used as a column, and polystyrene, for example, manufactured by Tosoh. Corp., having a molecular weight 68 to 8,400,000 is used as a molecular weight standard substance. The weight-average molecular weight (Mw) and the number-average molecular weight (Mn) are obtained in terms of polystyrene, and this ratio (Mw/Mn) is called molecular weight distribution. About 5 mg of a polymer is dissolved in 5 ml of o-dichlorobenzene to prepare a measuring sample having a concentration of about 1 mg/ml. 400 μl of the resulted sample solution is injected, elution solvent flow rate is controlled to 1.0 ml/min., and detection is conducted by a refractive index detector.

The olefin-based copolymer used in the present invention has an intrinsic viscosity [η] obtained by using a tetralin solvent at 135° C. of preferably from 0.1 to 10.0 dl/g, more preferably from 0.2 to 7.0 dl/g, and further preferably from 0.3 to 5.0 dl/g. When this intrinsic viscosity is too low, the heat-resistance of the resulting olefin-based copolymer may be inferior, and therefore, a pressure-sensitive adhesive comprising the copolymer may have poor pressure-sensitive adhesion force, particularly under a high temperature environment. On the other hand, when the intrinsic viscosity is too high, the resulting olefin-based copolymer may be poor in flexibility, and therefore, a pressure-sensitive adhesive comprising the copolymer may have poor pressure-sensitive adhesion force.

The intrinsic viscosity [η] is measured by using an Ubbellohde viscometer in tetralin at 135° C. 300 mg of the sample is dissolved in 100 ml of tetralin to prepare a 3 mg/ml solution. Further, this solution is diluted 2-fold, 3-fold and 5-fold, and the intrinsic viscosity of each of them is measured in a constant temperature oil bath at 135° C. (±0.1° C.). The measurement is repeated three times at each concentration, and the resulted values are averaged for use.

The olefin-based copolymer used in the present invention can be produced by using a known Ziegler-Natta catalyst or a known single site catalyst such as metallocene type, and the like. From the standpoint of uniformity of the composition distribution of the resulting polymer, a known single site catalyst such as metallocene type, and the like is preferable. Examples of this single site catalyst include metallocene type catalysts described, for example, in Japanese Patent Application Laid-Open (JP-A) Nos. 58-19309, 60-35005, 60-35006, 60-35007, 60-35008, 61-130314, 3-163088, 4-268307, 9-12790, 9-87313, 10-508055, 11-80233, and the like, and non-metallocene type complex catalysts described in JP-A Nos. 10-316710, 11-100394, 11-80228, 11-80227, 10-513489, 10-338706 and 11-71420. Among them, metallocene catalysts are generally used, and as suitable metallocene catalyst example, it is preferable to use a transition metal complex of group III to group XII of the periodic table which has at least one cyclopentadiene-type anion skeleton and has $C_1$ symmetric structure from the standpoint of the flexibility of the resulting polymer. Further, the method described in Japanese Patent Application No. 11-206054 can be exemplified as a suitable example of the production method using a metallocene catalyst in obtaining a polymer having higher molecular weight.

Subsequently, a thermoplastic resin composition comprises a unique olefin-based copolymer used in the present invention and such a thermoplastic resin composition is also described herein.

The thermoplastic resin composition used in the present invention is a thermoplastic resin composition comprising (i) a thermoplastic resin, and (ii) the olefin-based copolymer used in the present invention, as essential components. The used amounts of them are not particularly restricted, however, from the standpoints of flexibility and heat-resistance, the ratio by weight of a thermoplastic resin to an olefin-based copolymer is preferably from 1/99 to 95/5, more preferably from 3/97 to 90/10, particularly preferably from 5/95 to 80/20.

The component (i) used in the thermoplastic resin composition of the present invention is a thermoplastic resin. The component (i) can be widely selected from known various thermoplastic resins, and examples thereof include, for example, polyethylene-based resins such as a high density polyethylene, middle density polyethylene, low density polyethylene, linear low density polyethylene (LLDPE) and the like; polypropylene-based resin, polybutene-based resins, poly-4-methyl-pentene-1-based resins, polystyrene-based resins, polyester-based resins, polyamide-based resins, polyphenylene ether-based resins, polyphenylene oxide resins, polyacetal-based resins, polycarbonate-based resins and the like. As to component (i), (i-1) polyolefin-based resins are preferable; (i-2) polyolefin-based resins mainly composed of aliphatic olefins having 2 or more carbon atoms are more preferable; (i-3) polyolefin-based resins mainly composed of aliphatic olefins having 3 or more carbon atoms are further preferable; and (i-4) polypropylene-based resins are particularly preferable.

As the polypropylene-based resin (i-4), there can be used crystalline polypropylene mainly having isotactic or syndiotactic sequence structure of homo type or of random type containing a comonomer, or those having various structures such as block polypropylene obtained by multi-stage polymerization. This polypropylene-based resin can be obtained by adopting a gas phase polymerization method, bulk polymerization method, solvent polymerization method or multi-stage polymerization method combining them. The number-average molecular weight of the polymer is not particularly restricted and preferably is controlled from 10,000 to 1,000,000.

As the index of the crystallinity of the polypropylene-based resin (i-4), for example, melting point, crystal melting calorie and the like are used, and it is preferable that the melting point is from 80° C. to 176° C. and the crystal melting calorie is from 30 J/g to 120 J/g. It is further preferable that the melting point is from 120° C. to 176° C. and the crystal melting calorie is from 60 J/g to 120 J/g. When the melting point of a crystal is too low or the melting calorie is too low, the heat-resistance of the resulting thermoplastic resin composition may decrease, consequently, the pressure-sensitive adhesion force under a high temperature environment of a pressure-sensitive adhesive containing the aforesaid composition may decrease.

For producing the polypropylene-based resin (i-4), useful methods generally include those in which a homopolymer is obtained by homopolymerization of propylene via one stage or multi stages, or a copolymer is obtained by copolymerizing propylene with one or more olefins selected from olefins having 2 to 12 carbon atoms other than the propylene via one stage or multi stages, in a slurry polymerization, gas phase polymerization, bulk polymerization or a solution polymerization method or a polymerization method combining them, using a Ziegler-Natta catalyst combining a titanium-containing solid transition metal component and an organometal component, or a metallocene catalyst comprising a compound of a transition metal of group IV to group VI of the periodic table having at least one cyclopentadienyl skeleton and a co-catalyst component. Further, commercially available products can also be used.

In the thermoplastic resin composition used in the present invention, it is preferable that the bending modulus (Ub (MPa)) measured according to JIS K 7203 satisfies the relation of the following formula.

$$Ub \leq 1.5 \times Sb \times (Tb/100)^{3.3}$$

More preferably $$Ub \leq 1.4 \times Sb \times (Tb/100)^{3.3}$$

Further preferably $$Ub \leq 1.3 \times Sb \times (Tb/100)^{3.3}$$

Particularly preferably $$Ub \leq 1.2 \times Sb \times (Tb/100)^{3.3}$$

When the bending modulus is out of the above-described range, the thermoplastic resin composition may be inferior in flexibility, and, consequently, the resulting pressure-sensitive adhesive may have poor pressure-sensitive adhesion force. In the above-described formula, Ub represents the bending modulus (MPa) measured according to JIS K 7203, and Tb represents the added parts (%) of the thermoplastic resin composition.

In the olefin-based copolymer used in the present invention and a thermoplastic resin composition containing this olefin-based copolymer, known thermoplastic resins, rubber, and other components can be selected and compounded appropriately, if necessary, within a range wherein the object of the present invention does not deteriorate, and the thermoplastic resin composition used in the present invention may also be a thermoplastic resin composition comprising (i) a thermoplastic resin, (ii) a olefin-based copolymer used in the present invention and (iii) other elastomer, as essential components. In the component (i), the thermoplastic resin can be selected for use from various ethylene-based resins, various polypropylene-based resins, various polybutene-based resins, various polymethylpentene-based resins, polystyrene-based resins, copolymer resins of ethylene with acrylic monomers, copolymer resins of ethylene with vinyl acetate-based monomers, copolymer resins of ethylene with methacrylic monomers, acrylic resins, polyester-based resins, polycarbonate-based resins, nylon-based resins, polyvinyl alcohol-based resins and the like. As (iii), the other elastomer, there are exemplified ethylene/α-olefin-based copolymer rubber, ethylene/α-olefin/polyene-based copolymer rubber; and styrene-based rubber such as styrene-butadiene-styrene block copolymer (SBS), styrene-isoprene-styrene block copolymer (SIS), hydrogenated styrene-isoprene-styrene block copolymer (SPES), hydrogenated styrene-butadiene-styrene block copolymer (SEBS) and the like; diene-based rubber, known cross-linking rubber. And if necessary, other components can also be added to these components, and examples of these components which can be added include rosin-based resins, polyterpene-based resins, synthetic petroleum resins, cumarone-based resins, phenol-based resins, xylene-based resins, isoprene-based resins and the like.

In the olefin-based copolymer used in the present invention and a thermoplastic resin composition containing this olefin-based copolymer, if necessary, cross-linking can also be conducted such as sulfur cross-linking, peroxide cross-linking, metal ion cross-linking, silane cross-linking, resin cross-linking and the like according to conventionally known methods. As the cross-linking agent, there can be used cross-linking agents generally used for vulcanization of rubber, and there can be exemplified cross-linking agents such as sulfur, phenols resins, metal oxides, metal hydroxides, metal chlorides, p-quinonedioxime or bismaleimide-based cross-linking agents and the like. The cross-linking agent can be used alone, and for controlling the cross-linking speed, a cross-linking promoter may also be used together. As the cross-linking promoter, there can be used oxidizing agents such as red lead, dibenzothiazoyl sulfide and the like. Further, a metal oxide such as zinc oxide or the like, stearic acid and the like can also be used together as a dispersing agent. As the metal oxide, zinc oxide, magnesium oxide, lead oxide, calcium oxide and the like can be used, and zinc oxide or magnesium oxide is preferable. Further, the thermoplastic resin composition used in the present invention can be dynamically cross-linked in the presence of a cross-linking agent to obtain a cross-linked substance.

For obtaining the thermoplastic resin composition used in the present invention, the components as explained above may be advantageously kneaded using a usual kneading apparatus, for example, a rubber mill, Brabender mill, Banbury mixer, press kneader, ruder, twin-screw extruder and the like. The kneading apparatus may be any of closed type and open type apparatuses, and a closed type apparatus in which inert gas purging is possible is preferable. The kneading temperature is a temperature at which all of mixed constituent components are melted, and usually from 160 to 250° C., preferably from 180 to 240° C. The kneading time can not be discussed in absolute terms since it depends on the kind and quantity of a mixed constituent component, and the kind of a kneading apparatus, and in the case of use of a kneading apparatus such as a pressure kneader, Banbury mixed and the like, the kneading time is usually from about 3 to 10 minutes. In the kneading process, constituent components may be kneaded in one time, and alternatively, a multi-stage divided kneading method can also be adopted in which a part of constituent components is kneaded, then, the remaining constituent components are added and kneaded.

As additive components to the olefin-based copolymer and thermoplastic resin composition used in the present invention, various stabilizers such as an antioxidant, ozone degradation inhibitor, ultraviolet ray absorber, light stabilizer and the like can be appropriately compounded. Further, additives such as an antistatic agent, slipping agent, internal releasing agent, coloring agent, dispersing agent, anti-blocking agent, lubricant, anti-fogging agent and the like can appropriately be compounded.

In the olefin-based copolymer and thermoplastic resin composition used in the present invention, there can be appropriately compounded fillers such as glass fiber, carbon fiber, metal fiber, glass bead, asbestos, mica, calcium carbonate, potassium titanate whisker, talc, aramide fiber, barium sulfate, glass flake, fluorine resin and the like, mineral oil-based softeners such as naphthene oil, paraffin-based mineral oil, and the like, as additive components.

In the olefin-based copolymer and thermoplastic resin composition used in the present invention, there can be appropriately compounded a flame retardant as an additive component. Examples of the flame retardant include inorganic compounds such as an antimony-based flame retardant, aluminum hydroxide, magnesium hydroxide, zinc borate, guanidine-based flame retardant, zirconium-based flame retardant and the like, phosphates and phosphorus compounds such as ammonium polyphosphate, ethylenebistris(2-cyanoethyl)phosphonium chloride, tris(tribromophenyl)phosphate, tris(3-hydroxypropyl)phosphine oxide and the like, chlorine-based flame retardants such as paraffin chloride, polyolefin chloride, perchlorocyclopentadecane and the like, bromine-based flame retardants such as hexabromobenzene, ethylenebisdibromonorbornanedicarboxyimide, ethylenebistetrabromophthalimide, tetrabromobisphenol A derivative, tetrabromobisphenol S, tetrabromodipentaerythritol and the like, and mixtures thereof.

The olefin-based copolymer and thermoplastic resin composition used in the present invention can also be used as a foamed body by compounding a foaming agent as an additive component. As specific examples of the foaming agent which can be suitably used for such foaming, there can be added main foaming agents such as sodium bicarbonate, ammonium bicarbonate, ammonium carbonate and the like, nitroso compounds such as N,N'-dinitrosopentamethylenetetramine and the like, azo compounds such as azocarbonamide, azoisobutyronitrile and the like, benzenesulfonylhydrazine, p,p'-oxybis-(benzenesulfonylhydrazide), toluenesulfonylhydrazide, and sulfonylhydrazides such as toluenesulfonylhydrazide derivatives and the like. Further, a foaming aid can be appropriately used in the foaming processing. As specific examples of the foaming aid, examples thereof include salicylic acid, urea and compounds thereof, and the like.

When high frequency processing is required in the present invention, any polar polymer can be added. As specific examples of such a polar polymer, examples thereof include copolymers or multinary copolymers of ethylene with one or more comonomers selected from monocarboxylic acids such acrylic acid, methacrylic acid, ethacrylic acid, crotonic acid and the like, dicarboxylic acids such as maleic acid, fumaric acid, itaconic acid, citraconic acid and the like and monoesters thereof, acrylates or methacrylates such as methyl methacrylate, methylacrylate, ethyl acrylate and the like, vinyl esters of saturated carboxylic acids such as vinyl acetate, vinyl propionate and the like, and ionomers thereof.

In the pressure-sensitive adhesive of the present invention, a pressure-sensitive adhesion imparting agent may also be added for the purpose of improvement of tack and for other purposes, though the pressure-sensitive adhesion imparting agent is not an essential constituent element. As the pressure-sensitive adhesion imparting agent, examples thereof include so-called tackifiers such as natural rosin resins such as rosin, dammar and the like, modified rosin and derivatives thereof, terpene-based resins and modified thereof, aliphatic hydrocarbon resins, aromatic hydrocarbon resins, alkylphenol resins, cumarone-indene resins and the like. Among them, terpenes such as terpenephenol, α-polyterpene and the like are preferable compounds. Specifically, YS Resin TO-105, Clearon (these are manufactured by Yasuhara Chemical K.K.), Alcon, Estergum, Pencel (these are manufactured by Arakawa Kagaku K.K.), and the like are exemplified.

The pressure-sensitive adhesive of the present invention can also be used for a multi-layer laminate of two or more layers which has one layer comprising a layer composed of the pressure-sensitive adhesive of the present invention as the outermost layers or layer. In this laminate, materials constituting the layers may be mutually the same or different, and the materials constituting the layers can be selected from known thermoplastic resins other than the thermoplastic resin composition used in the present invention, rubber, and other components. Of these materials, the thermoplastic resin can be selected from various ethylene-based resins, various polypropylene-based resins, various polybutene-based resins, various polymethylpentene-based resins, polystyrene-based resins, copolymer resins of ethylene with acrylic monomers, copolymer resins of ethylene with vinyl acetate-based monomers, copolymer resins of ethylene with methacrylic monomers, acrylic resins, polyester-based resins, polycarbonate-based resins, nylon-based resins, polyvinyl alcohol-based resins and the like. As the rubber, examples thereof include ethylene/α-olefin-based copolymer rubber, ethylene/α-olefin/polyene-based copolymer rubber, styrene-based rubber, hydrogenated styrene-based rubber, diene-based rubber, known cross-linking rubber. Examples of other components include materials selected from woven fabric and non-woven fabric and the like, various stabilizers, various additives, fillers, mineral oil-based softeners, flame retardants, high frequency processing aids, rosin-based resins, polyterpene-based resins, synthetic petroleum resins, cumarone-based resins, phenol-based resins, xylene-based resins, isoprene-based resins and the like, and these can be appropriately compounded.

The method for producing the above-mentioned pressure-sensitive adhesive is not particularly restricted, and, for example, the adhesive can also be prepared in the form of a single layer sheet or film by dry-blending components or kneading components using a usual kneading apparatus, for example, a rubber mill, Brabender mill, Banbury mixer, press kneader, ruder, twin-screw extruder and the like, and then, subjecting the product to an inflation method, or extrusion method using a T die, single-screw drawing (extruding) method, twin-screw drawing (extruding) method, calender roll method and the like, or it can also be prepared in the form of a laminated sheet or film by adopting technologies such as co-extrusion, extrusion coating method (also referred to as extrusion laminate method) and the like using an inflation film producing apparatus or T die film producing apparatus and the like. The thickness of the resulting sheet or film is not particularly restricted, and preferably is from 0.001 to 5 mm, further preferably is from 0.005 to 2 mm.

The pressure-sensitive adhesive of the present invention may also be used as a pressure-sensitive sheet or film composed of a substrate and a pressure-sensitive adhesive layer. The substrate is not particularly restricted, and examples thereof include crystalline polypropylene, polypropylene-based resins obtained by homopolymerization of propylene or random or block-copolymerization of propylene with an α-olefin, polyethylene-based resins of low density polyethylene, middle density polyethylene, high density polyethylene and linear low density polyethylene, poly-4-methyl-pentene-1-ethylene-α-olefin copolymer, propylene-α-olefin copolymer, ethylene-ethyl acrylate copolymer, ethylene-vinyl acetate copolymer, ethylene-methyl methacrylate copolymer, ethylene-n-butyl acrylate copolymer, and the like, providing they are thermoplastic resins. Further, mixtures of any combination of the above-mentioned resins can also be used. Among them, polyethylene-based resins or polypropylene-based resins having good compatibility with the olefin-based copolymer used in a pressure-sensitive adhesive layer are preferable from the standpoint that a composition having excellent flexibility, pressure-sensitive adhesion and scratch-resistance is effectively obtained. For giving pressure-sensitive adhesion between a pressure-sensitive adhesive layer and a substrate without inter-layer peeling, those comprising a pressure-sensitive adhesive layer and a substrate made of the same thermoplastic resin are preferable, and those show excellent recycling property. Further, the pressure-sensitive adhesion of a pressure-sensitive adhesive layer can be controlled by the blending ratio of an olefin-based copolymer and a thermoplastic resin used in the pressure-sensitive adhesive layer. If the content of a thermoplastic resin is increased in the blending system, its use as a substrate is also possible.

The above-mentioned substrate may be a single layer sheet or film, or may also be a composite sheet or film of two or more layers. The substrate may be colorless and transparent, however, the above-mentioned raw materials may also be subjected to coloration or printing before employed in various uses.

For obtaining the pressure-sensitive adhesive sheet or film of the present invention, a substrate layer and a pressure-sensitive adhesive layer can be prepared in the form of a laminated sheet or film by using technologies such as co-extrusion, extrusion coating method (also referred to as extrusion laminate method) and the like using an inflation film producing apparatus or T die film producing apparatus and the like. The thickness of the resulting sheet or film is not particularly restricted, and is preferably from 0.001 to 5 mm, further preferably is from 0.005 to 2 mm.

Further, when a pressure-sensitive adhesive sheet or film is used particularly as a wound article, it is possible, from the standpoint of drawing ability, and namely, self releasing property, to sandwich releasing paper, or to provide a coating of a releasing agent, for example, a silicone-based agent, such as an agent mainly composed of a long chain alkyl group adduct of polyethyleneimine, and the like, to further decrease affinity with its rear surface. Alternatively, it is possible to use various functional additives according to demands such as compounding of a releasing agent and other additives to improve lubrication property of the surface, and the like, within a range wherein the effect of the present invention does not deteriorate.

The pressure-sensitive adhesive obtained by the present invention can be suitably used as a pressure-sensitive adhesive sheet or film for packaging and casing, office and domestic use, electric insulation or identification, fixation or binding, repair and duct works, masking tape (sheet or film) or as a protective sheet or film for prevention of scratches in the transportation, storage and stacking from production to processing step, or in the prevention of scratches in secondary work in bending work and press work, of a stainless and aluminum plate as a construction material, a decorative laminated plate, a steel plate, a resin plate, glass, or domestic electric products, precise machinery, or an automobile body, as well as in other uses.

When the olefin-based copolymer used in the present invention and a thermoplastic resin composition containing this olefin-based copolymer is used as a hot-melt adhesive, it is suitably used for mutual adhesion of a polyolefin-based resin or adhesion of a polyolefin-based resin with a different material, or mutual adhesion of rubber or adhesion of rubber with a different material. As the rubber herein referred to, vulcanized rubber or non-vulcanized rubber is applied, and examples thereof include butyl rubber, isoprene rubber, butadiene rubber, ethylene propylene rubber, ethylene propylene diene rubber, styrene butadiene rubber, chloroprene rubber, natural rubber, acrylic rubber, olefin-based elastomer, styrene-based elastomer and the like. As the different material used, paper, cloth, leather, wood, various synthetic resins, metal, synthetic resin plate, decorative plywood, metal plate, coated steel plate, stone materials, glass and the like are exemplified.

As the adhesion method, various methods are applicable. For example, for adhering a polyolefin resin, adhesion methods generally used in hot-melt adhesion are useful such as a method in which the hot-melt adhesive of the present invention, which has been melted, is applied on the adhesion surface between a polyolefin resin molded article and another adhesion article, and immediately they are adhered under pressure. Alternatively, a method is useful in which a tape or sheet made of the hot-melt adhesion of the present invention is sandwiched between both adhesion articles, and they are melted for adhesion by a hot air furnace, heat press, high frequency and the like, as well as other methods. Likewise, for adhering vulcanized rubber, adhesion methods generally used in hot-melt adhesion are useful such as a method in which the hot-melt adhesive of the present invention, which has been melted, is applied on the adhesion surface between a vulcanized rubber molded article and another adhesion article, and immediately they are adhered under pressure. Alternatively, a method is useful in which a tape or sheet made of the hot-melt adhesion of the present invention is sandwiched between both adhesion articles, and they are melted for adhesion by a hot air furnace, heat press, high frequency and the like, as well as other methods. Further, in adhesion of non-vulcanized rubber, vulcanization and adhesion can be conducted simultaneously by a method in which the hot-melt adhesive of the present invention, which has been melted, is applied on the adhesion surface between a non-vulcanized rubber compound molded article and another adhesion article, and then, the temperature and the pressure required for vulcanization of rubber are applied. Alternatively, a method is useful in which a tape or sheet made of the hot-melt adhesion of the present invention is sandwiched between both adhesion articles, and the temperature and the pressure required for vulcanization of rubber are applied by a hot air furnace, heat press, high frequency and the like, as well as other methods.

EXAMPLES

The following examples will explain the present invention further in detail below, but they are only illustrative and do not limit the scope of the invention.

[1] Synthesis of Olefin-based Copolymer

Example 1

Ethylene, propylene and 1-butene were copolymerized continuously using a 100 L stainless steel (SUS) polymerization vessel equipped with a stirring blade. That is, hexane as a polymerization solvent, ethylene, propylene and 1-butene were continuously fed from the lower portion of the polymerization vessel at speeds of 83 L/hr, 4.5 Kg/hr, 1.9 Kg/hr and 17.1 Kg/hr, respectively. On the other hand, the polymerization solution was continuously extracted from the upper portion of the polymerization vessel so that the amount of the polymerization solution in the polymerization vessel was kept at 100 L. Dimethylsilyl (tetramethylcyclopentadienyl)(3-tert-butyl-5-m ethyl-2-phenoxy)titanium dichloride, triphenylmethyltetrakis (pentafluorophenyl)borate, and triisobutylaluminum (hereinafter, abbreviated as TIBA) as catalysts were fed continuously into the polymerization vessel from the lower portion of the polymerization vessel at speeds of 0.012 g/hr, 0.640 g/hr and 2.314 g/hr. Further, the molecular weight was controlled by using hydrogen. The copolymerlzation reaction was conducted at 50° C. while allowing cooling water to circulate through a jacket mounted on the outer surface of the polymerization vessel. A small amount of ethanol was added to the polymerization solution extracted from the polymerization vessel to stop the polymerization reaction, the monomers were removed, the reaction solution was washed with water, then, the solvent was removed by steam in a large amount of water to take out a copolymer, which was dried under reduced pressure over night and day at 80° C. According to the above-described procedure, an ethylene-propylene-1-butene copolymer (Polymer A) was prepared at a speed of 4.4 Kg/hr.

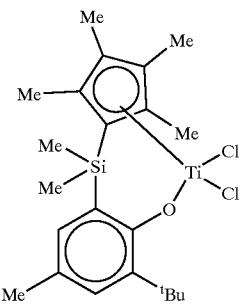

Dimethylsilyl(tetramethylcyclopentadienyl)(3-tert-buty 1-5-methyl-2-phenoxy)titanium Dichloride Example 2

Ethylene, propylene, 1-butene and 5-ethylidene-2-norbornene (ENB) were copolymerized continuously using a 100 L SUS polymerization vessel equipped with a stirring blade. That is, hexane as a polymerization solvent, and ethylene, propylene, 1-butene and 5-ethylidene-2-norbornene (ENB) were continuously fed from the lower portion of the polymerization vessel at speeds of 83 L/hr, 2.0 Kg/hr, 8.3 Kg/hr, 12.7 Kg/hr, and 6.3 Kg/hr, respectively. On the other hand, the polymerization solution was continuously extracted from the upper portion of the polymerization vessel so that the amount of the polymerization solution in the polymerization vessel was kept at 100 L. Dimethylsilyl (tetramethylcyclopentadienyl)(3-tert-butyl-5-m ethyl-2-phenoxy)titanium dichloride, triphenylmethyltetrakis (pentafluorophenyl)borate, and triisobutylaluminum (hereinafter, abbreviated as TIBA) as catalysts were fed continuously into the polymerization vessel from the lower portion of the polymerization vessel at speeds of 0.092 g/hr, 2.755 g/hr and 5.251 g/hr. Further, the molecular weight was controlled by using hydrogen. The copolymerization reaction was conducted at 50° C. while allowing cooling water to circulate through a jacket mounted on the outer surface of the polymerization vessel. A small amount of ethanol was added to the polymerization solution extracted from the polymerization vessel to stop the polymerization reaction, the monomers were removed, the reaction solution was washed with water, then, the solvent was removed by steam in a large amount of water to take out a copolymer, which was dried under reduced pressure over night and day at 80° C. According to the above-described procedure, an ethylene-propylene-1-butene-5-ethylidene-2-norbornene copolymer (Polymer B) was prepared at a speed of 2.39 Kg/hr.

[2] Analysis of Olefin-based Copolymer (1) IR Measurement

The olefin-based copolymers (Polymer A, and Polymer B) were analyzed by IR to find methylene rocking vibration of ethylene at 720 cm$^{-1}$, methyl group rocking vibration at 1154 cm$^{-1}$ ascribed to methyl branching of propylene, and methyl group rocking vibration at 770 cm$^{-1}$ ascribed to ethyl branching of 1-butene, leading to confirmation that the monomer components had been copolymerized.

(2) Intrinsic Viscosity [η]

The intrinsic viscosity [η] was measured by using an Ubbellohde viscometer in tetralinat 135° C. 300 mg of the sample is dissolved in 100 ml of tetralin to prepare a 3 mg/ml solution. Further, this solution was diluted 2-fold, 3-fold and 5-fold, and the intrinsic viscosity of each of them was measured in a constant temperature oil bath at 135° C. (±0.1° C.). The measurement was repeated three times at each concentration, and the resulted values were averaged for use.

(3) Measurement of Molecular Weight Distribution

Measurement of the molecular weight distribution was conducted by a gel permeation chromatography (GPC) method (using 150C/GPC apparatus, manufactured by Waters Co.). The elution temperature was 140° C., and a Shodex Packed Column A-80M manufactured by Showa Denko K.K. was used as a column, and polystyrene (manufactured by Tosoh. Corp., molecular weight 68 to 8,400,000) was used as a molecular weight standard substance. The weight-average molecular weight (Mw) and the number-average molecular weight (Mn) were obtained in terms of polystyrene, and this ratio (Mw/Mn) was called molecular weight distribution. About 5 mg of a polymer was dissolved in 5 ml of o-dichlorobenzene to prepare a measuring sample having a concentration of about 1 mg/ml. 400 μl of the resulted sample solution was injected. Elution solvent flow rate was controlled to 1.0 ml/min., and detection was conducted by a refractive index detector.

(4) Measurement by Differential Scanning Calorimeter

Measurement was conducted by using a differential scanning calorimeter (DSC 220C manufactured by Seiko Instruments Inc.), at a measuring speed of 10° C./min. in any of temperature raising and lowering processes.

(5) Measurement of 5-Ethylidene-2-norbornene (ENB) Content

The olefin-based copolymer (Polymer B) was heat-pressed into a film having a thickness of 0.5 mm, then, the peak transmittance (wave number 1650 cm$^{-1}$) derived from 5-ethylidene-2-norbornene was measured by using an infrared spectrophotometer, and the 5-ethylidene-2-norbornene content in the olefin-based copolymer was calculated.

I Evaluation of Pressure-sensitive Adhesive Sheet for Surface Protection (Table 2)

Example 3

90 parts by weight of the olefin-based copolymer (Polymer A) and 10 parts by weight of EXCELENE EPX KS37G1 (manufactured by Sumitomo Chemical Co., Ltd., MFR=2.5 g/10 min.) were kneaded previously for 2 minutes at a temperature of 200° C. and a screw revolution of 10 rpm using PLASTICODER type PLV151 manufactured by Brabender Corp., then, kneaded at 80 rpm for 10 minutes to obtain a pressure-sensitive adhesive. This pressure-sensitive adhesive and homopolypropylene (manufactured by Sumitomo Chemical Co., Ltd., MFR=10 g/10 min.) as a substrate were molded into 100 μm films respectively, and they were laminated and heated for melt-adhesion in an oven at 200° C. to obtain a pressure-sensitive adhesive sheet for surface protection.

Example 4

80 parts by weight of the olefin-based copolymer (Polymer A) and 20 parts by weight of EXCELENE EPX KS37G1 (manufactured by Sumitomo Chemical Co., Ltd., MFR=2.5 g/10 min.) were processed in the same manner as in Example 3.

Example 5

70 parts by weight of the olefin-based copolymer (Polymer A) and 30 parts by weight of EXCELENE EPX KS37G1 (manufactured by Sumitomo Chemical Co., Ltd., MFR=2.5 g/10 min.) were processed in the same manner as in Example 3.

Example 6

The pressure-sensitive adhesive of Example 5 and EXCELENE EPX KS37G1 (manufactured by Sumitomo Chemical Co., Ltd., MFR=2.5 g/10 min.) as a substrate were worked into a laminated film by using a multi-layer inflation die manufactured by Plako K.K. Specifically, the pressure-sensitive adhesive was extruded from an extruder having φ 50 mm and L/D=28 at 190° C., while EXCELENE EPX KS37G1 was extruded from an extruder having φ 50 mm and L/D=28 at 190° C., and these were extruded through a multi-layer inflation die having a caliber of 150 mm and a die lip of 2 mm, and inflation-molded at a die temperature of 190° C., a blow ratio of 1.5 and a drawing speed of 5 m/min to obtain a film having a thickness of the pressure-sensitive adhesive layer of 50 μm and a thickness of the substrate layer of 50 μm.

Example 7

The pressure-sensitive adhesive of Example 5 and homopolypropylene (manufactured by Sumitomo Chemical Co., Ltd., MFR=7 g/10 min.) as a substrate were molded into a laminated film by using a 3-kind 3-layer coextrusion T die (die width: 600 mm) manufactured by CBC Tec. Specifically, the pressure-sensitive adhesive was extruded from an extruder having φ 40 mm and L/D=32 at 230° C., while, the homopolypropylene was extruded from two extruders (both L/D=32) at 230° C., and these were made into 2-kind 2-layer structure via a feed block and extruded through a T die, then, cooled to solid by chill rolls controlled at 20° C. to obtain a film having a thickness of the pressure-sensitive adhesive layer of 50 μm and a thickness of the substrate layer of 50 μm.

Comparative Example 1

The same procedure was conducted as in Example 3 except that an ethylene-α-olefin copolymer (manufactured by Dow Corp., trade name: Affinity PF1140, [η]=0.98 dl/g, Mw=1.7×10$^5$, Mw/Mn=2.3, melting point=97.5° C., melting calorie=86 J/g) was used as the pressure-sensitive adhesive layer.

(Ability Test)

1. Peeling Strength

A pressure-sensitive adhesive sheet or film of Examples 3 to 7 and Comparative Example 1 was pasted on a steel plate (manufactured by Kansai Paint Co., Ltd.) coated with melamine, and press-adhered by a 5 Kg rubber-coated roller, then, left for 30 minutes at 23° C., and force necessary in peeling the pressure-sensitive adhesive sheet or film at a peeling width of 25 mm, a peeling angle of 180○, a peeling speed of 500 mm/min. and a temperature of 23° C. was measured. Likewise, the sample was left for 30 minutes at −20° C., and force necessary in peeling at −20° C. was also measured.

2. Peeling Strength with the Lapse of Time

A pressure-sensitive adhesive sheet or film was pasted in the same manner as in the above-mentioned item, left for 15 hours at 90° C. in a hot air circulation type oven, and the temperature of each coated plate was cooled to 23° C., then, force necessary in peeling the pressure-sensitive adhesive sheet or film at a peeling width of 25 mm, a peeling angle of 180○, and a peeling speed of 500 mm/min. was measured.

3. Evaluation of contamination property

After completion of the peeling test with the lapse of time in the above-mentioned item, the surface of the coated plate which had been peeled was visually observed, and presence or absence of clouding due to contamination of appearance was evaluated.

The results of Examples 3 to 7 and Comparative Example 1 are shown in Table 2.

II Evaluation of Adhesion of Hot-melt Adhesives for Polyolefin Resin (Table 3)

Example 8

50 parts by weight of the olefin-based copolymer (Polymer A) and 50 parts by weight of Alcon P-125 (manufactured by Arakawa Kagaku K.K.) were melted completely at 180° C. over a period of 30 minutes, to obtain a pressure-sensitive adhesive. Then, the resulted pressure-sensitive adhesive was applied at a thickness of 50 μm between bi-axially drawn (extrusion) polypropylene films (25 μm, using polypropylene having MFR=2 g/10 min), and the polypropylene films were press-adhered under conditions of 60° C.×1 Kg/cm$^2$×1 min., and left for 15 hours at 23° C. without any other treatment. Peeling test (peeling angle 180○, peeling speed 300 mm/min., 23° C.) was conducted using this test piece (25 mm×50 mm).

Comparative Example 2

Evaluation was conducted in the same manner as in Example 8 except that an ethylene vinylacetate copolymer (MFR=7 g/10 min, vinylacetate content 28 wt %) was used instead of the olefin-based copolymer (Polymer A) in Example 8.

The results of Example 8 and Comparative Example 2 are shown in Table 3.

III Evaluation of Hot-melt Adhesives for Rubber Adhesion (Table 4)

(Production of Hot-melt Adhesive Sheet)

Example 9

70 parts by weight of the olefin-based copolymer (Polymer B) and 30 parts by weight of random polypropylene (manufactured by Sumitomo Chemical Co., Ltd., MFR=1.5 g/10 min.) were kneaded previously for 2 minutes at a temperature of 200° C. and a screw revolution of 10 rpm using PLASTICODER type PLV151 manufactured by Brabender Corp., then, kneaded at 80 rpm for 10 minutes, then, molded into a 150 mm×150 mm×0.1 mm sheet by a heat press at 180° C.

Example 10

50 parts by weight of the olefin-based copolymer (Polymer B) and 50 parts by weight of random polypropylene (manufactured by Sumitomo Chemical Co., Ltd., MFR=1.5 g/10 min.) were processed in the same manner as in Example 9.

(Production of Adhesion Article)

Rubber and compounding agents "a" shown below (all parts by weight) were kneaded by a BB-2 mixer manufactured by Kobe Steel Ltd. The mixture and compounding agents "b" were kneaded on 10 inch open rolls, to obtain a rubber compound which can be vulcanized. Canvas for graining was placed on a 150 mm×150 mm×2 mm mold frame, and the above-mentioned rubber compound was placed thereon, and press-vulcanized for 10 minutes under a temperature of 170° C., the canvas was removed after the vulcanization to obtain a rubber test piece for adhesion test.

Compounding agent "a": ESPRENE 512F manufactured by Sumitomo Chemical Co., Ltd.: 100, Diana Process Oil PS 430 manufactured by Idemitsu Kosan Co., Ltd.: 40, ASAHI 60G (FEF carbon black) manufactured by Asahi Carbon K.K.: 90, stearic acid: 2, two kinds of zinc oxide: 5, STRACTOR WB43 manufactured by S & S: 2

Compounding agent "b": vulcanization accelerator CBS: 1.2, vulcanization accelerator: MBT 0.4, powdery sulfur: 0.6

(Adhesion Test)

The above-mentioned adhesion article was cut into two 100 mm×25 mm×2 mm pieces, and the above-mentioned hot-melt adhesive sheet (60 mm×25 mm×0.1 mm) was sandwiched between the two pieces laminated so that grain surfaces face each other, and press-adhered under conditions of 180° C.×10 Kg/cm²×10 min., and left for 24 hours at 23° C. without any other treatment. Peeling test (peeling angle 180○, peeling speed 50 mm/min.) was conducted using this test piece (Table 4).

Further, the above-mentioned adhesion article was cut into two 150 mm×25 mm×2 mm pieces, and the above-mentioned hot-melt adhesive sheet (40 mm×25 mm×0.1 mm) was sandwiched between the two pieces laminated so that grain surfaces face each other overlapping 40 mm, and press-adhered under conditions of 180° C.×10 Kg/cm²×10 min., and left for 24 hours at 23° C. without any other treatment. Reference lines were drawn at 10 mm positions from both sides of the overlapped region of this test body. The test body was attached to holders, and extended until the distance between the reference lines reached 70 mm, and left under standard condition for 24 hours. Then, the test body was removed, and left under standard condition for 4 hours, then, the test body was observed not to find harmful shift, peeling and the like. The adhered connected portion maintained the flexibility of the rubber test piece.

TABLE 1

|  |  | Example 1 Polymer A | Example 2 Polymer B |
|---|---|---|---|
| Polymerization temperature | ° C. | 50 | 50 |
| Ethylene | Kg/h | 4.5 | 2.0 |
| Propylene | Kg/h | 1.9 | 8.3 |
| 1-butene | Kg/h | 17.1 | 12.7 |
| *1 ENB | Kg/h | 0 | 6.3 |
| *2 (f) | g/h | 2.314 | 5.251 |
| *3 (g) | g/h | 0.640 | 2.755 |
| *4 (h) | g/h | 0.012 | 0.092 |
| ENB content | Iodine value | 0 | 28 |
| Crystal melting point | ° C. | None | None |
| Crystal melting calorie | mj/mg | None | None |
| Crystallization temperature | ° C. | None | None |
| Crystallization calorie | mj/mg | None | None |
| Intrinsic viscosity [η] | dl/g | 0.89 | 1.0 |
| GPC Mw/Mn |  | 1.9 | 2.2 |
| Tension (JIS K 6251) |  |  |  |
| Tensile strength at break | MPa | 0.07 | 0.02 |

*1 ENB: 5-ethylidene-2-norbornene
*2 (f): triisobutylaluminum
*3 (g): triphenylmethyltetrakis(pentafluorophenyl) borate
*4 (h): dimethylsilyl(tetramethylcyclopentadienyl) (3-tert-butyl-5-methyl-2-phenoxy) titanium dichloride

TABLE 2

[g/25 mm]

|  | 23° C. peeling strength | −20° C. peeling strength | Peeling strength with the lapse of time | Contamination property |
|---|---|---|---|---|
| Example 3 | 600 | 140 | 800 | None |
| Example 4 | 900 | 200 | 120 | None |
| Example 5 | 120 | 80 | 80 | None |
| Example 6 | 550 | 20 | 20 | None |
| Example 7 | 600 | 170 | 10 | None |

TABLE 3

[g/25 mm]

|  | 23° C. peeling strength | −20° C. peeling strength |
|---|---|---|
| Example 8 | 4000 | 500 |
| Comparative example 2 | 130 | 5 |

TABLE 4

[g/25 mm]

|  | 23° C. peeling strength | 60° C. peeling strength |
|---|---|---|
| Example 9 | 4000 | 4400 |
| Example 10 | 7500 | 9600 |

[3] Evaluation of Thermoplastic Resin Composition

Compounds shown in Tables 5 to 8 were kneaded previously for 2 minutes at a temperature of 200° C. and a screw revolution of 10 rpm using PLASTICODER type PLV151 manufactured by Brabender Corp., then, kneaded at 80 rpm for 10 minutes. The compositions were press-molded according to JIS K 6758 to produce sheets.

Properties of the thermoplastic resin compositions described in the examples were measured by the following methods.

(1) Tensile Test: JIS K 6251

Test piece form; dumbbell No. 3

Tension speed: 200 mm/min.

Number of test piece: 3

Regarding the elongation at break EB(%), for removing the result of irregular low elongation at break, results revealing tensile strength at break which is 80% or less of the median of the measured results were deleted, and the remaining measured results were arithmetically averaged to give a result to be used.

(2) Heat-resistance Test:

It was conducted according to JIS K 6301 "6. aging test" air heat aging test (6.3) except that the test temperature was changed to 110° C. and the test time was changed to 100 hours. The test pieces were suspended and heated in a tester chamber, and herein, the test pieces were controlled so that they did not contact each other or did not contact with any parts of the wall of the tester chamber.

Hardness: ASTM D2240

(3) Stability of Surface Nature and Condition:

Occurrence of stickiness and cloud on the surface of the sample before and after the heat-resistance test was judged.

1: Stickiness and cloud are recognized: Judge X

2: Cloud is recognized: Judge Δ

3: Stickiness and cloud do not occur: Judge ○

[4] Calculation

The relation of the elongation at break EB(%) of the thermoplastic resin composition of Examples 8 to 13 obtained by blending Polymer A of the present invention with a polypropylene-based resin, and of the polypropylene resin shown in Example 14, and the weight proportion (Pa) of the olefin-based copolymer in the resin composition was regressed on a curve, to obtain the following quintet regression formula. The contribution ratio ($R^2$) was 0.9745.

$$EB = -28799 \times Pa^5 + 65859 \times Pa^4 - 48394 \times Pa^3 + 12995 \times Pa^2 - 1086 \times Pa + 870.15 \quad \text{Formula 4}$$

Formula 4 was regressed on a straight line using the least square method in Pa=0.20 to 0.60 region to obtain the gradient S[2/6].

The gradient S[2/6] had a value as shown below, and satisfied the relation of Formula 1.

$$S[2/6]=0.98$$

$$S[2/6] \geq -800 \qquad \text{Formula 1}$$

In the analogous calculation method, the relation of the elongation at break EB(%) of the thermoplastic resin composition of Examples 15 to 20 obtained by blending Polymer B of the present invention with a polypropylene-based resin, and of the polypropylene resin shown in Example 21, and the weight proportion (Pa) of the olefin-based copolymer in the resin composition was regressed on a curve, to obtain the following quintet regression formula. The contribution ratio ($R^2$) was 0.9997.

$$EB=82108 \times Pa^5 - 128621 \times Pa^4 + 78018 \times Pa^3 - 23605 \times Pa^2 + 3754.3 \times Pa + 539.94 \qquad \text{Formula 5}$$

Formula 5 was regressed on a straight line using the least square method in Pa=0.20 to 0.60 and Pa=0.30 to 0.50 regions to obtain the multiple correlation coefficients R[2/6] and R[3/5] and the gradients S[2/6] and S[3/5]. In the straight line regression, in the case of Pa=0.20 to 0.60, numerical values at 0.01 interval including 0.20 and 0.60 were substituted in Formula 5 to obtain the relation of the resulted 41 points, and in the case of Pa=0.30 to 0.50, numerical values at 0.01 interval including 0.30 and 0.50 were substituted in Formula 5 to obtain the relation of the resulted 21 points.

The multiple correlation coefficients R[2/6] and R[3/5] had values as shown below, and satisfied the relation of Formula 2.

$$R[2/6]=0.4804$$

$$R[3/5]=0.8993$$

$$R[3/5]-R[2/6]=0.4189$$

$$R[3/5]-R[2/6] \geq 0.15 \qquad \text{Formula 2}$$

The gradients S[2/6] and S[3/5] had values as shown below, and satisfied the relations of Formula 1 and Formula 3.

$$S[2/6]=54.29$$

$$S[2/6] \geq -800 \qquad \text{Formula 1}$$

$$S[3/5]=-70.32$$

$$S[3/5]-S[2/6]=-124.61$$

$$S[3/5]-S[2/6] \leq -50 \qquad \text{Formula 3}$$

TABLE 5

|  |  | Example | | | |
|---|---|---|---|---|---|
|  |  | 8 | 9 | 10 | 11 |
| Polymer A | wt % | 20 | 30 | 40 | 50 |
| PP-1 | wt % | 80 | 70 | 60 | 50 |
| Pa |  | 0.20 | 0.30 | 0.40 | 0.50 |
| Tension (JIS K 6251) Elongation at break (EB) | % | 890 | 860 | 830 | 730 |

PP-1: Propylene-ethylene random copolymer resin which has a MI of 2.8 (g/10 min.) at a temperature of 230° C. and a load of 2.16 kg, contains 3.7 wt % of ethylene and has a 20 C. xylene-soluble component content of 3.2%.

TABLE 6

|  |  | Example | | |
|---|---|---|---|---|
|  |  | 12 | 13 | 14 |
| Polymer A | wt % | 60 | 70 | 0 |
| PP-1 | wt % | 40 | 30 | 100 |
| Pa |  | 0.60 | 0.70 | 0.00 |
| Tension (JIS K 6251) Elongation at break (EB) | % | 750 | 850 | 870 |

TABLE 7

|  |  | Example | | | |
|---|---|---|---|---|---|
|  |  | 15 | 16 | 17 | 18 |
| Polymer B | wt % | 20 | 30 | 40 | 50 |
| PP-2 | wt % | 80 | 70 | 60 | 50 |
| Pa |  | 0.20 | 0.30 | 0.40 | 0.50 |
| Tension (JIS K 6251) Elongation at break (EB) | % | 790 | 810 | 800 | 800 |
| Stability of surface nature and condition |  |  |  |  |  |
| Before heat-resistant test |  | — | — | — | ○ |
| After heat-resistant test |  | — | — | — | ○ |
| Hardness (shore D) |  | — | — | — | 42.7 |

PP-2: Propylene-ethylene random copolymer resin which has a MI of 0.88 (g/10 min.) at a temperature of 230° C. and a load of 2.16 kg, contains 4.9 wt % of ethylene and has a 20° C. xylene-soluble component content of 5.2%.

TABLE 8

|  |  | Example | | |
|---|---|---|---|---|
|  |  | 19 | 20 | 21 |
| Polymer B | wt % | 60 | 70 | 0 |
| PP-3 | wt % | 40 | 30 | 100 |
| Pa |  | 0.60 | 0.70 | 0.00 |
| Tension (JIS K 6251) Elongation at break (EB) | % | 860 | 1280 | 540 |
| Stability of surface Nature and condition |  |  |  |  |
| Before heat-resistant test |  | — | ○ | ○ |
| After heat-resistant test |  | — | ○ | ○ |
| Hardness (shore D) |  | — | 20.7 | 63.1 |

As described above, the present invention can provide a pressure-sensitive adhesive sheet or film which maintains preferable pressure-sensitive adhesion without showing a remarkable change with the lapse of time even under low temperature environment and high temperature environment and irrespective of the use temperature range, and it shows excellent peeling property without contaminating the surface of a coated article after use, and it gives an excellent balance of heat-resistance, cold-resistance and weather-resistance.

Further, the present invention can provide a unique hot-melt adhesive which adheres without using an organic solvent, and it does not inhibit stable adhesion force and the flexibility of a connected portion adhered therewith even under low temperature environment and high temperature environment and irrespective of the environmental temperature under which a connected article is placed.

What is claimed is:

1. A pressure-sensitive adhesive comprising an olefin-based copolymer, which copolymer satisfies the following requirements (1) and (2):
   (1) the olefin-based copolymer has a tensile strength at break of 2.0 MPa or less measured according to JIS K 6251, and
   (2) an elongation at break EB(%) measured according to JIS K 6251 of a resin composition essentially consisting of (i) the olefin-based copolymer and (ii) either of below-mentioned polypropylene-based resins (a) and (b) satisfies the following formula (1), wherein:

$$S[2/6] \geq -800 \quad (1)$$

(2-1) the polypropylene-based resin satisfies the following requirements (i) and (ii):
      (i) the propylene-based resin is (a) a propylene-ethylene random copolymer having a melt flow rate of 3.0±0.5 g/10 min. measured at 230° C. under a load of 2.16 kg, and having an ethylene unit content of 3.5±1% by weight, or (b) a propylene-ethylene random copolymer having a melt flow rate of 1.0±0.5 g/10 min. measured at 230° C. under a load of 2.16 kg, and having an ethylene unit content of 5.0±1% by weight, and
      (ii) the content of xylene-soluble component contained in the propylene-based resin is not more than 20% by weight at 20° C., and
   (2-2) S[2/6] is a slope of a primary straight line, which straight line is obtained by a process consisting of the steps of:
      (i) plotting the elongation at break EB(%) on the ordinate, and the content (Pa; part by weight) of the olefin-based copolymer contained in the resin composition on the abscissa, respectively, to obtain a curve,
      (ii) deriving a quintet multiple regression from the above-mentioned curve to obtaining a multiple regression formula, wherein (a) the multiple regression formula has at least seven data of Pa values (Pa=0.00, 0.20, 0.30, 0.40, 0.50, 0.60 and 0.70), provided that a total weight of the olefin-based copolymer and the polypropylene-based resin is 1 part by weight, and (b) when the multiple regression formula has more than eight data of Pa values, all Pa values are plotted at an interval of 0.10 or less, and
      (iii) approximating a multiple-regression curve of the above-mentioned multiple regression formula, according to a least square method, in a Pa region of 0.20 to 0.60 to obtain the primary straight line.

2. The pressure-sensitive adhesive according to claim 1 wherein the elongation at break EB(%) satisfies the following formula (2), $$R[3/5]-R[2/6] \geq 0.15 \quad (2)$$

wherein R[3/5] and R[2/6] is a multiple correlation coefficient of a primary straight line, which straight line is obtained by a process consisting of the steps of:
      (i) plotting the elongation at break EB(%) on the ordinate, and the content (Pa; part by weight) of the olefin-based copolymer contained in the resin composition on the abscissa, respectively, to obtain a curve,
      (ii) deriving a quintet multiple regression from the above-mentioned curve to obtaining a multiple regression formula, wherein (a) the multiple regression formula has at least seven data of Pa values (Pa=0.00, 0.20, 0.30, 0.40, 0.50, 0.60 and 0.70), provided that a total weight of the olefin-based copolymer and the polypropylene-based resin is 1 part by weight, and (b) when the multiple regression formula has more than eight data of Pa values, all Pa values are plotted at an interval of 0.10 or less, and
      (iii) approximating a multiple-regression curve of the above-mentioned multiple regression formula, according to a least square method, in a Pa region of 0.30 to 0.50 and 0.20 to 0.60 to obtain the primary straight line.

3. A pressure-sensitive adhesive comprising a thermoplastic resin composition, which composition contains:
   (I) 1 to 95% by weight of a thermoplastic resin, and
   (II) 5 to 99% by weight of an olefin-based copolymer, which satisfies the following requirements (1) and (2):
      (1) the olefin-based copolymer has a tensile strength at break of 2.0 MPa or less measured according to JIS K 6251, and
      (2) an elongation at break EB(%) measured according to JIS K 6251 of a resin composition essentially consisting of (i) the olefin-based copolymer and (ii) either of below-mentioned polypropylene-based resins (a) and (b) satisfies the following formula (1), wherein:

$$S[2/6] \geq -800 \quad (1)$$

(2-1) the polypropylene-based resin satisfies the following requirements (i) and (ii):
      (i) the propylene-based resin is (a) a propylene-ethylene random copolymer having a melt flow rate of 3.0±0.5 g/10 min. measured at 230° C. under a load of 2.16 kg, and having an ethylene unit content of 3.5±1% by weight, or (b) a propylene-ethylene random copolymer having a melt flow rate of 1.0±0.5 g/10 min. measured at 230° C. under a load of 2.16 kg, and having an ethylene unit content of 5.0±1% by weight, and
      (ii) the content of xylene-soluble component contained in the propylene-based resin is not more than 20% by weight at 20° C., and
   (2-2) S[2/6] is a slope of a primary straight line, which straight line is obtained by a process consisting of the steps of:
      (i) plotting the elongation at break EB(%) on the ordinate, and the content (Pa; part by weight) of the olefin-based copolymer contained in the resin composition on the abscissa, respectively, to obtain a curve,
      (ii) deriving a quintet multiple regression from the above-mentioned curve to obtaining a multiple regression formula, wherein (a) the multiple regression formula has at least seven data of Pa values (Pa=0.00, 0.20, 0.30, 0.40, 0.50, 0.60 and 0.70), provided that a total weight of the olefin-based copolymer and the polypropylene-based resin is 1 part by weight, and (b) when the multiple regression formula has more than eight data of Pa values, all Pa values are plotted at an interval of 0.10 or less, and
      (iii) approximating a multiple-regression curve of the above-mentioned multiple regression formula, according to a least square method, in a Pa region of 0.20 to 0.60 to obtain the primary straight line.

4. A pressure-sensitive adhesive sheet comprising one or more layers, at least one outermost layer of which sheet contains a pressure-sensitive adhesive comprising an olefin-based copolymer, which copolymer satisfies the following requirements (1) and (2):

(1) the olefin-based copolymer has a tensile strength at break of 2.0 MPa or less measured according to JIS K 6251, and (2) an elongation at break EB(%) measured according to JIS K 6251 of a resin composition essentially consisting of (i) the olefin-based copolymer and (ii) either of below-mentioned polypropylene-based resins (a) and (b) satisfies the following formula (1), wherein:

$$S[2/6] \geq -800 \tag{1}$$

(2-1) the polypropylene-based resin satisfies the following requirements (i) and (ii):
  (i) the propylene-based resin is (a) a propylene-ethylene random copolymer having a melt flow rate of 3.0±0.5 g/10 min. measured at 230° C. under a load of 2.16 kg, and having an ethylene unit content of 3.5±1% by weight, or (b) a propylene-ethylene random copolymer having a melt flow rate of 1.0±0.5 g/10 min. measured at 230° C. under a load of 2.16 kg, and having an ethylene unit content of 5.0±1% by weight, and
  (ii) the content of xylene-soluble component contained in the propylene-based resin is not more than 20% by weight at 20° C., and (2-2) S[2/6] is a slope of a primary straight line, which straight line is obtained by a process consisting of the steps of:
  (i) plotting the elongation at break EB(%) on the ordinate, and the content (Pa; part by weight) of the olefin-based copolymer contained in the resin composition on the abscissa, respectively, to obtain a curve,
  (ii) deriving a quintet multiple regression from the above-mentioned curve to obtaining a multiple regression formula, wherein (a) the multiple regression formula has at least seven data of Pa values (Pa=0.00, 0.20, 0.30, 0.40, 0.50, 0.60 and 0.70), provided that a total weight of the olefin-based copolymer and the polypropylene-based resin is 1 part by weight, and (b) when the multiple regression formula has more than eight data of Pa values, all Pa values are plotted at an interval of 0.10 or less, and
  (iii) approximating a multiple-regression curve of the above-mentioned multiple regression formula, according to a least square method, in a Pa region of 0.20 to 0.60 to obtain the primary straight line.

5. A pressure-sensitive adhesive film comprising one or more layers, at least one outermost layer of which sheet contains a pressure-sensitive adhesive comprising an olefin-based copolymer, which copolymer satisfies the following requirements (1) and (2):

(1) the olefin-based copolymer has a tensile strength at break of 2.0 MPa or less measured according to JIS K 6251, and (2) an elongation at break EB(%) measured according to JIS K 6251 of a resin composition essentially consisting of (i) the olefin-based copolymer and (ii) either of below-mentioned polypropylene-based resins (a) and (b) satisfies the following formula (1), wherein:

$$S[2/6] \geq -800 \tag{1}$$

(2-1) the polypropylene-based resin satisfies the following requirements (i) and (ii):
  (i) the propylene-based resin is (a) a propylene-ethylene random copolymer having a melt flow rate of 3.0±0.5 g/10 min. measured at 230° C. under a load of 2.16 kg, and having an ethylene unit content of 3.5±1% by weight, or (b) a propylene-ethylene random copolymer having a melt flow rate of 1.0±0.5 g/10 min. measured at 230° C. under a load of 2.16 kg, and having an ethylene unit content of 5.0±1% by weight, and
  (ii) the content of xylene-soluble component contained in the propylene-based resin is not more than 20% by weight at 20° C., and (2-2) S[2/6] is a slope of a primary straight line, which straight line is obtained by a process consisting of the steps of:
  (i) plotting the elongation at break EB(%) on the ordinate, and the content (Pa; part by weight) of the olefin-based copolymer contained in the resin composition on the abscissa, respectively, to obtain a curve,
  (ii) deriving a quintet multiple regression from the above-mentioned curve to obtaining a multiple regression formula, wherein (a) the multiple regression formula has at least seven data of Pa values (Pa=0.00, 0.20, 0.30, 0.40, 0.50, 0.60 and 0.70), provided that a total weight of the olefin-based copolymer and the polypropylene-based resin is 1 part by weight, and (b) when the multiple regression formula has more than eight data of Pa values, all Pa values are plotted at an interval of 0.10 or less, and
  (iii) approximating a multiple-regression curve of the above-mentioned multiple regression formula, according to a least square method, in a Pa region of 0.20 to 0.60 to obtain the primary straight line.

6. A hot-melt adhesive comprising an olefin-based copolymer, which copolymer satisfies the following requirements (1) and (2):

(1) the olefin-based copolymer has a tensile strength at break of 2.0 MPa or less measured according to JIS K 6251, and (2) an elongation at break EB(%) measured according to JIS K 6251 of a resin composition essentially consisting of (i) the olefin-based copolymer and (ii) either of below-mentioned polypropylene-based resins (a) and (b) satisfies the following formula (1), wherein:

$$S[2/6] \geq -800 \tag{1}$$

(2-1) the polypropylene-based resin satisfies the following requirements (i) and (ii):
  (i) the propylene-based resin is (a) a propylene-ethylene random copolymer having a melt flow rate of 3.0±0.5 g/10 min. measured at 230° C. under a load of 2.16 kg, and having an ethylene unit content of 3.5±1% by weight, or (b) a propylene-ethylene random copolymer having a melt flow rate of 1.0±0.5 g/10 min. measured at 230° C. under a load of 2.16 kg, and having an ethylene unit content of 5.0±1% by weight, and
  (ii) the content of xylene-soluble component contained in the propylene-based resin is not more than 20% by weight at 20° C., and (2-2) S[2/6] is a slope of a primary straight line, which straight line is obtained by a process consisting of the steps of:
  (i) plotting the elongation at break EB(%) on the ordinate, and the content (Pa; part by weight) of the olefin-based copolymer contained in the resin composition on the abscissa, respectively, to obtain a curve,
  (ii) deriving a quintet multiple regression from the above-mentioned curve to obtaining a multiple regression formula, wherein (a) the multiple regression formula has at least seven data of Pa values (Pa=0.00, 0.20, 0.30, 0.40, 0.50, 0.60 and 0.70), provided that a total weight of the olefin-based copolymer and the polypropylene-based resin is 1 part by weight, and (b) when the multiple regression formula has more than eight data of Pa values, all Pa values are plotted at an interval of 0.10 or less, and (iii) approximating a multiple-regression curve of the above-mentioned multiple regression formula, according to a least square method, in a Pa region of 0.20 to 0.60 to obtain the primary straight line.

7. A hot-melt adhesive comprising a thermoplastic resin composition, which composition contains:

(I) 1 to 95% by weight of a thermoplastic resin, and (II) 5 to 99% by weight of an olefin-based copolymer, which satisfies the following requirements (1) and (2):

(1) the olefin-based copolymer has a tensile strength at break of 2.0 MPa or less measured according to JIS K 6251, and (2) an elongation at break EB(%) measured according to JIS K 6251 of a resin composition essentially consisting of (i) the olefin-based copolymer and (ii) either of below-mentioned polypropylene-based resins (a) and (b) satisfies the following formula (1), wherein:

$$S[2/6] \geq -800 \tag{1}$$

(2-1) the polypropylene-based resin satisfies the following requirements (i) and (ii):

(i) the propylene-based resin is (a) a propylene-ethylene random copolymer having a melt flow rate of 3.0±0.5 g/10 min. measured at 230° C. under a load of 2.16 kg, and having an ethylene unit content of 3.5±1% by weight, or (b) a propylene-ethylene random copolymer having a melt flow rate of 1.0±0.5 g/10 min. measured at 230° C. under a load of 2.16 kg, and having an ethylene unit content of 5.0±1% by weight, and (ii) the content of xylene-soluble component contained in the propylene-based resin is not more than 20% by weight at 20° C., and (2-2) S[2/6] is a slope of a primary straight line, which straight line is obtained by a process consisting of the steps of:

(i) plotting the elongation at break EB(%) on the ordinate, and the content (Pa; part by weight) of the olefin-based copolymer contained in the resin composition on the abscissa, respectively, to obtain a curve, (ii) deriving a quintet multiple regression from the above-mentioned curve to obtaining a multiple regression formula, wherein (a) the multiple regression formula has at least seven data of Pa values (Pa=0.00, 0.20, 0.30, 0.40, 0.50, 0.60 and 0.70), provided that a total weight of the olefin-based copolymer and the polypropylene-based resin is 1 part by weight, and (b) when the multiple regression formula has more than eight data of Pa values, all Pa values are plotted at an interval of 0.10 or less, and (iii) approximating a multiple-regression curve of the above-mentioned multiple regression formula, according to a least square method, in a Pa region of 0.20 to 0.60 to obtain the primary straight line.

* * * * *